US011840032B2

(12) United States Patent
Rahman et al.

(10) Patent No.: US 11,840,032 B2
(45) Date of Patent: Dec. 12, 2023

(54) METHOD OF REPAIRING A COMBUSTOR LINER OF A GAS TURBINE ENGINE

(71) Applicant: PRATT & WHITNEY CANADA CORP., Longueuil (CA)

(72) Inventors: Mizanur Rahman, Longueuil (CA); Clément Drouin Laberge, Terrebonne (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 486 days.

(21) Appl. No.: 16/920,868

(22) Filed: Jul. 6, 2020

(65) Prior Publication Data
US 2022/0001500 A1    Jan. 6, 2022

(51) Int. Cl.
*B29C 73/26* (2006.01)
*G05B 19/402* (2006.01)
*B23B 35/00* (2006.01)
*F01D 25/00* (2006.01)
*F01D 25/24* (2006.01)

(52) U.S. Cl.
CPC ............. *B29C 73/26* (2013.01); *B23B 35/00* (2013.01); *G05B 19/402* (2013.01); *F01D 25/005* (2013.01); *F01D 25/24* (2013.01)

(58) Field of Classification Search
CPC ....... B29C 73/26; B23B 35/00; G05B 19/402; F01D 25/005; F01D 25/24; F01D 5/288;
(Continued)

(56) References Cited

U.S. PATENT DOCUMENTS 6,380,512 B1 * 4/2002 Emer .................. F01D 5/005
219/121.85
6,640,547 B2   11/2003 Leahy, Jr.
(Continued)

FOREIGN PATENT DOCUMENTS

CN    86108916 A    7/1988
CN    1842255 A    10/2006
(Continued)

OTHER PUBLICATIONS

English translation of Europe patent document No. EP2719494 dated Apr. 16, 2014, https://patents.google.com/patent/EP2719494A1/en?oq=EP2719494, accessed on Jul. 6, 2020.
(Continued)

*Primary Examiner* — Xuemei G Chen
(74) *Attorney, Agent, or Firm* — Norton Rose Fulbright Canada LLP

(57) ABSTRACT

Methods and systems for characterizing holes in a combustor liner of a gas turbine engine, and associated repair methods are provided. One method comprises receiving first measured data of the combustor liner in an uncoated state. The method includes determining a first location and a first orientation of a first hole and a first location and a first orientation of a second hole in the combustor liner using the first measured data. The method includes receiving second measured data of the combustor liner in a coated state where the second hole is at least partially obstructed by a coating and the first hole is substantially unobstructed by the coating. The method includes inferring a second location of the second hole of the combustor liner in the coated state using a known spacing between the first location of the first hole and the first location of the second hole. The characterization of the holes may be used to re-drill the obstructed second hole.

12 Claims, 22 Drawing Sheets

(58) Field of Classification Search
CPC .......... F01D 9/065; F01D 5/005; F01D 5/186; F23R 3/06; F23R 2900/00019; F23R 2900/03041; F23R 3/002; B23P 2700/06; B23P 2700/13; F05D 2230/13; F05D 2240/11; F05D 2240/12; F05D 2240/35; F05D 2240/81; F05D 2260/202; F05D 2260/81; F05D 2270/804; F05D 2270/8041

See application file for complete search history.

(56) References Cited

U.S. PATENT DOCUMENTS

| | | | |
|---|---|---|---|
| 6,644,032 B1 | 11/2003 | Jorgensen et al. | |
| 6,723,951 B1* | 4/2004 | McGraw | B23K 26/04 219/121.71 |
| 6,868,675 B1 | 3/2005 | Kuhn et al. | |
| 6,909,800 B2 | 6/2005 | Vaidyanathan | |
| 7,124,487 B2 | 10/2006 | Kuhn et al. | |
| 7,329,832 B2 | 2/2008 | Hoebel et al. | |
| 7,527,469 B2 | 5/2009 | Zaborovsky et al. | |
| 7,677,045 B2 | 3/2010 | Jorgensen et al. | |
| 7,725,210 B2 | 5/2010 | Hoebel et al. | |
| 7,789,288 B1 | 9/2010 | Johnson | |
| 7,805,822 B2 | 10/2010 | Hanley | |
| 8,001,793 B2 | 8/2011 | Patel et al. | |
| 8,381,526 B2 | 2/2013 | Berry et al. | |
| 8,407,893 B2 | 4/2013 | Patel et al. | |
| 8,437,010 B2 | 5/2013 | Bostanjoglo et al. | |
| 8,578,581 B2* | 11/2013 | Bellerose | G05B 19/4097 29/557 |
| 8,579,935 B2 | 11/2013 | DeVries et al. | |
| 9,322,560 B2 | 4/2016 | Erbas-Sen et al. | |
| 9,383,742 B2 | 7/2016 | Li et al. | |
| 9,702,817 B2 | 7/2017 | Worth et al. | |
| 9,760,986 B2 | 9/2017 | Ramamurthy et al. | |
| 10,060,626 B2 | 8/2018 | Heinze et al. | |
| 10,077,714 B2 | 9/2018 | Siders et al. | |
| 10,378,775 B2 | 8/2019 | Patel et al. | |
| 10,473,331 B2 | 11/2019 | Quach et al. | |
| 11,151,405 B1* | 10/2021 | Hoffmann | G06F 18/23 |
| 11,346,230 B1* | 5/2022 | Schneider | F01D 5/02 |
| 2002/0076097 A1* | 6/2002 | Vaidyanathan | G06T 7/73 382/154 |
| 2006/0037323 A1 | 2/2006 | Reynolds et al. | |
| 2006/0157456 A1* | 7/2006 | Hoebel | B23K 26/389 219/121.71 |
| 2007/0019213 A1* | 1/2007 | Vaidyanathan | G06T 7/73 356/626 |
| 2007/0241084 A1* | 10/2007 | Hoebel | B23K 26/389 219/121.71 |
| 2009/0213216 A1* | 8/2009 | Hastilow | G05B 19/401 700/114 |
| 2009/0220349 A1* | 9/2009 | Bolms | F01D 5/005 451/6 |
| 2012/0268747 A1* | 10/2012 | Bostanjoglo | F01D 5/005 356/602 |
| 2013/0268107 A1* | 10/2013 | Bostanjoglo | F01D 5/005 700/166 |
| 2014/0174091 A1 | 6/2014 | Ivory et al. | |
| 2015/0190890 A1 | 7/2015 | Ozturk | |
| 2015/0258634 A1 | 9/2015 | Basdere et al. | |
| 2016/0243654 A1* | 8/2016 | Hu | B23K 26/382 |
| 2016/0348911 A1 | 12/2016 | Polyzopoulos et al. | |
| 2016/0370007 A1 | 12/2016 | Hongoh | |
| 2017/0058686 A1* | 3/2017 | Bancheri | F01D 11/003 |
| 2017/0132775 A1* | 5/2017 | Ramamurthy | G06T 15/10 |
| 2017/0140539 A1* | 5/2017 | Wang | B25J 9/1697 |
| 2017/0356652 A1 | 12/2017 | Singh et al. | |
| 2018/0073738 A1 | 3/2018 | Rasmusson | |
| 2018/0149361 A1 | 5/2018 | Burd | |
| 2018/0283690 A1 | 10/2018 | Lemoine et al. | |
| 2018/0335212 A1 | 11/2018 | Quach et al. | |
| 2018/0355801 A1 | 12/2018 | Kington et al. | |
| 2019/0106994 A1* | 4/2019 | Ng | F01D 5/286 |
| 2019/0162412 A1 | 5/2019 | Bengtson et al. | |
| 2019/0345831 A1 | 11/2019 | Freeman et al. | |
| 2020/0001404 A1* | 1/2020 | Turcotte | F02C 7/24 |
| 2021/0130946 A1* | 5/2021 | Beck | C23C 14/30 |
| 2021/0207484 A1* | 7/2021 | Beck | F01D 9/065 |
| 2021/0383030 A1* | 12/2021 | Ramamurthy | F01D 5/005 |

FOREIGN PATENT DOCUMENTS

| | | |
|---|---|---|
| EP | 2719494 A1 | 4/2014 |
| EP | 2881816 A2 | 6/2015 |
| EP | 3211550 A1 | 8/2017 |
| JP | 2001048291 A | 2/2001 |
| WO | 2017197868 A1 | 11/2017 |

OTHER PUBLICATIONS

English translation of Europe patent document No. EP3211550 dated Aug. 30, 2017, https://patents.google.com/patent/EP3211550A1/en?oq=EP3211550, accessed on Jul. 6, 2020.

Autodesk, To create a Point-Cloud Picked-Points alignment, www.autodesk.com, Sep. 7, 2018.

Autodesk, To align the part using a point-cloud, www.autodesk.com, Sep. 7, 2018.

Seungkwan Lee et al., Universal Bounding Box Regression and Its Applications, Computer Vision—ACCV 2018, Apr. 15, 2019, pp. 373-387.

innovmetric.com, Boost Alignment Capabilities by Combining Object Types, https://www.innovmetric.com/en/boost-alignment-capabilities-combining-object-types, accessed on Apr. 4, 2020.

English translation of WIPO patent document No. WO 2017/197868 dated Nov. 23, 2017, https://patents.google.com/patent/WO2017197868A1/en?oq=WO2017197868A1, accessed on Jul. 23, 2020.

English translation of Japan patent document No. JP2001048291 dated Feb. 20, 2001, https://patents.google.com/patent/JP2001048291A/en?oq=JP2001048291A, accessed on Jul. 24, 2020.

English translation of China patent document No. CN1842255A dated Oct. 4, 2006, https://patents.google.com/patent/CN1842255A/en?oq=CN1842255A, accessed on Jul. 24, 2020.

English translation of China patent document No. CN86108916A dated Jul. 20, 1988, https://www35.orbit.com/, accessed on Oct. 5, 2020.

European Patent Office, Communication re. extended European search report re: European Patent Application No. 21184104.4, dated Nov. 30, 2021.

European Patent Office, Communication pursuant to Article 94(3) EPC re: European Patent Application No. 21184104.4, dated Oct. 24, 2022.

* cited by examiner

| Point | X-coordinates | Y-coordinates | Z-coordinates |
|---|---|---|---|
| 1 | $X_1$ | $Y_1$ | $Z_1$ |
| 2 | $X_2$ | $Y_2$ | $Z_2$ |
| 3 | $X_3$ | $Y_3$ | $Z_3$ |
| 4 | $X_4$ | $Y_4$ | $Z_4$ |
| 5 | $X_5$ | $Y_5$ | $Z_5$ |
| 6 | $X_6$ | $Y_6$ | $Z_6$ |
| 7 | $X_7$ | $Y_7$ | $Z_7$ |
| 8 | $X_8$ | $Y_8$ | $Z_8$ |
| 9 | $X_9$ | $Y_9$ | $Z_9$ |
| 10 | $X_{10}$ | $Y_{10}$ | $Z_{10}$ |
| 11 | $X_{11}$ | $Y_{11}$ | $Z_{11}$ |
| 12 | $X_{12}$ | $Y_{12}$ | $Z_{12}$ |
| 13 | $X_{13}$ | $Y_{13}$ | $Z_{13}$ |
| 14 | $X_{14}$ | $Y_{14}$ | $Z_{14}$ |
| 15 | $X_{15}$ | $Y_{15}$ | $Z_{15}$ |
| 16 | $X_{16}$ | $Y_{16}$ | $Z_{16}$ |
| 17 | $X_{17}$ | $Y_{17}$ | $Z_{17}$ |
| 18 | $X_{18}$ | $Y_{18}$ | $Z_{18}$ |
| 19 | $X_{19}$ | $Y_{19}$ | $Z_{19}$ |
| 20 | $X_{20}$ | $Y_{20}$ | $Z_{20}$ |
| ... | ... | ... | ... |
| n | $X_n$ | $Y_n$ | $Z_n$ |

FIG. 13

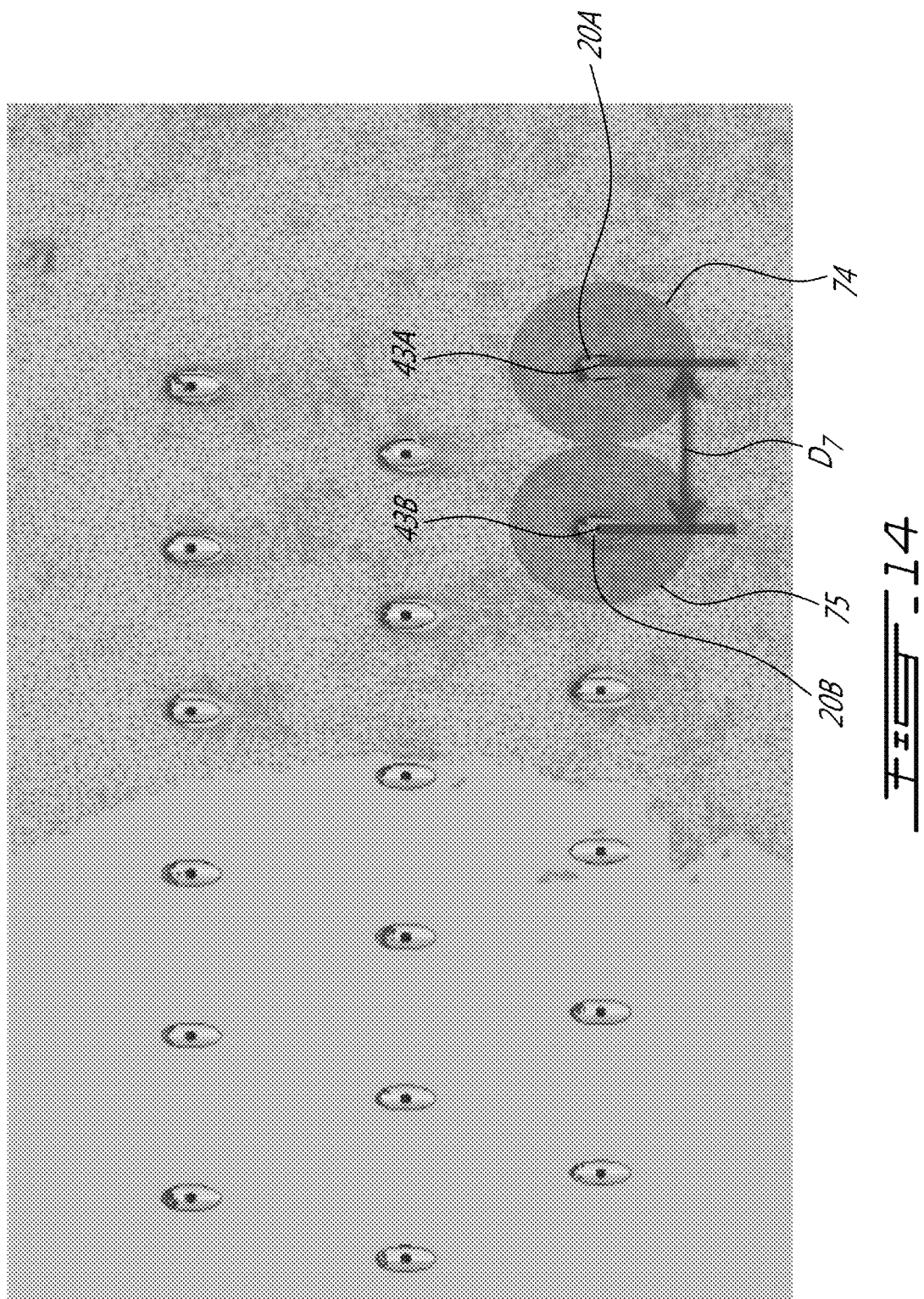

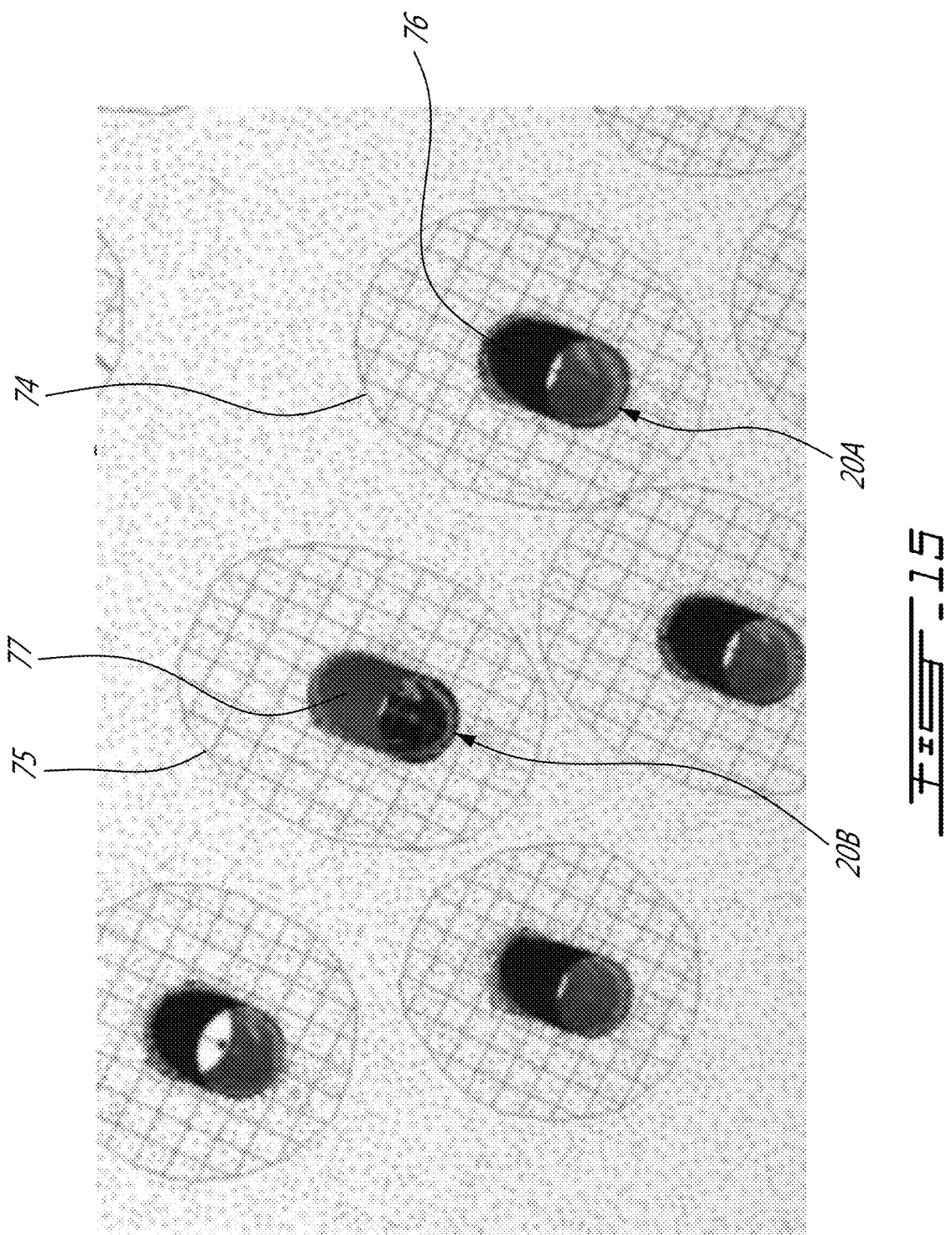

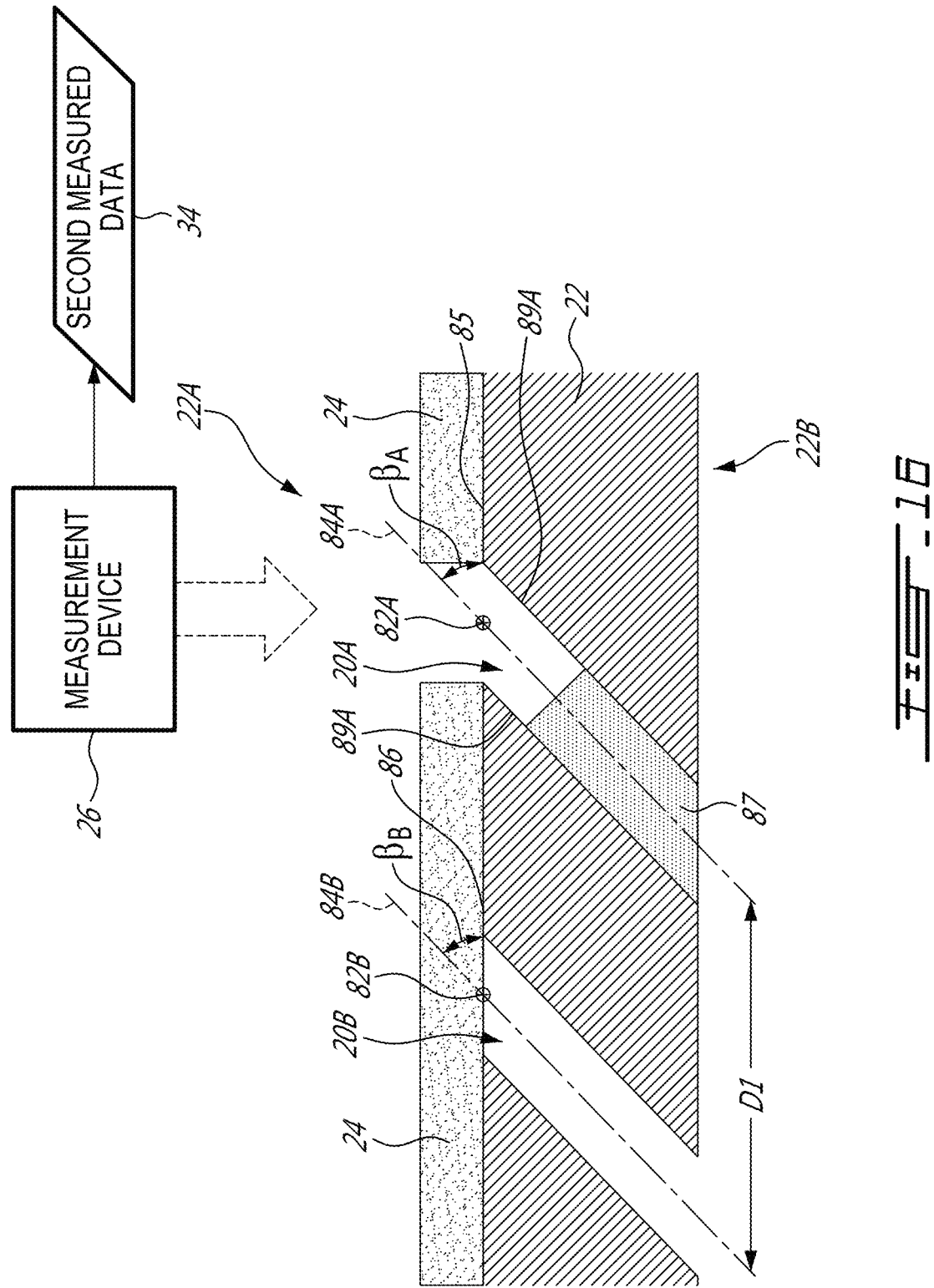

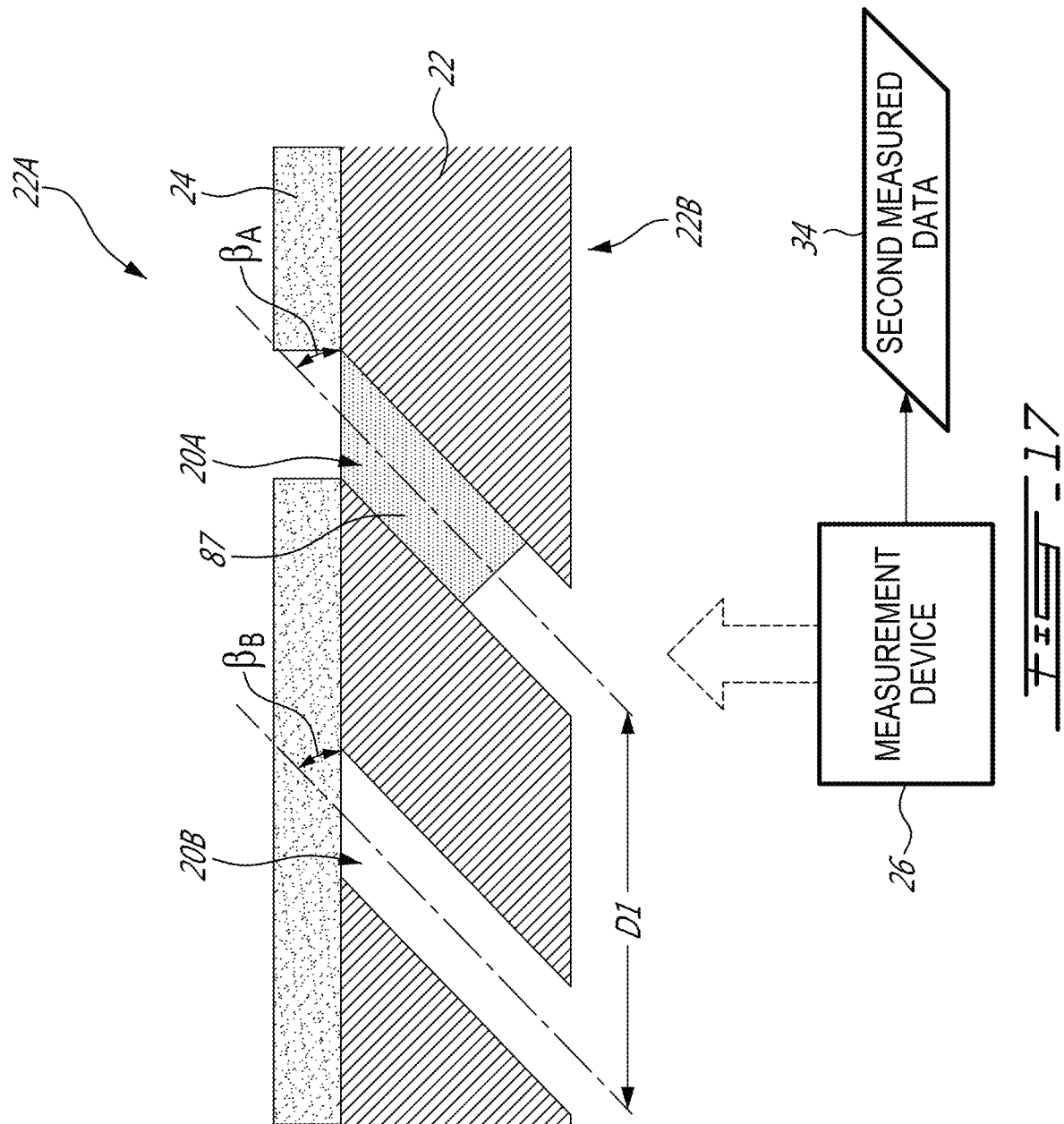

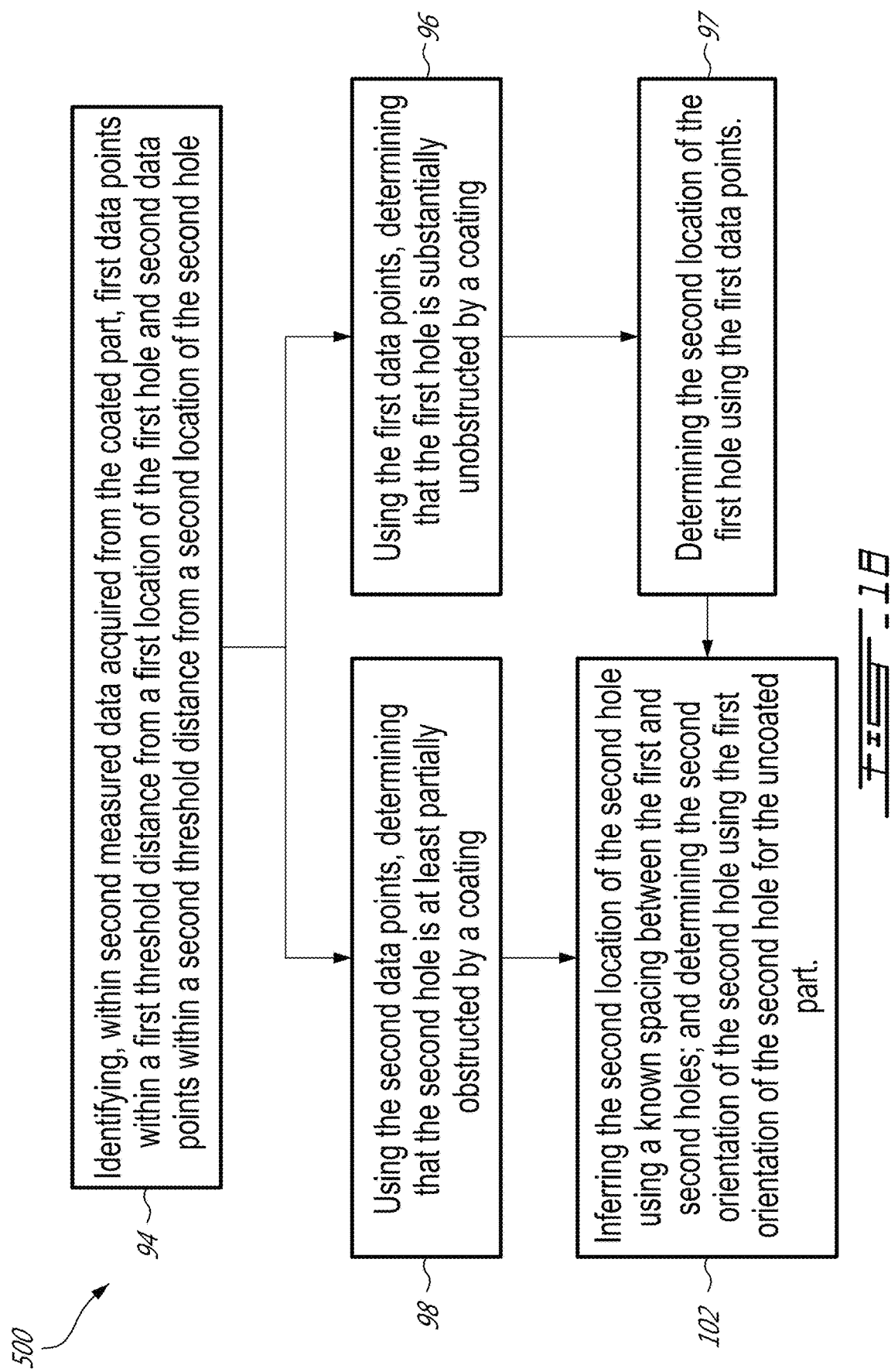

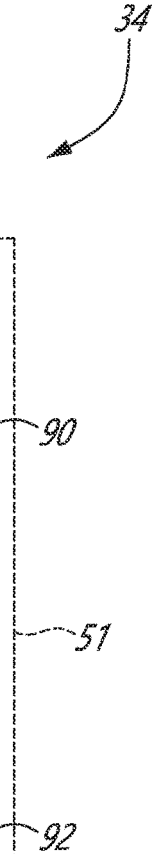

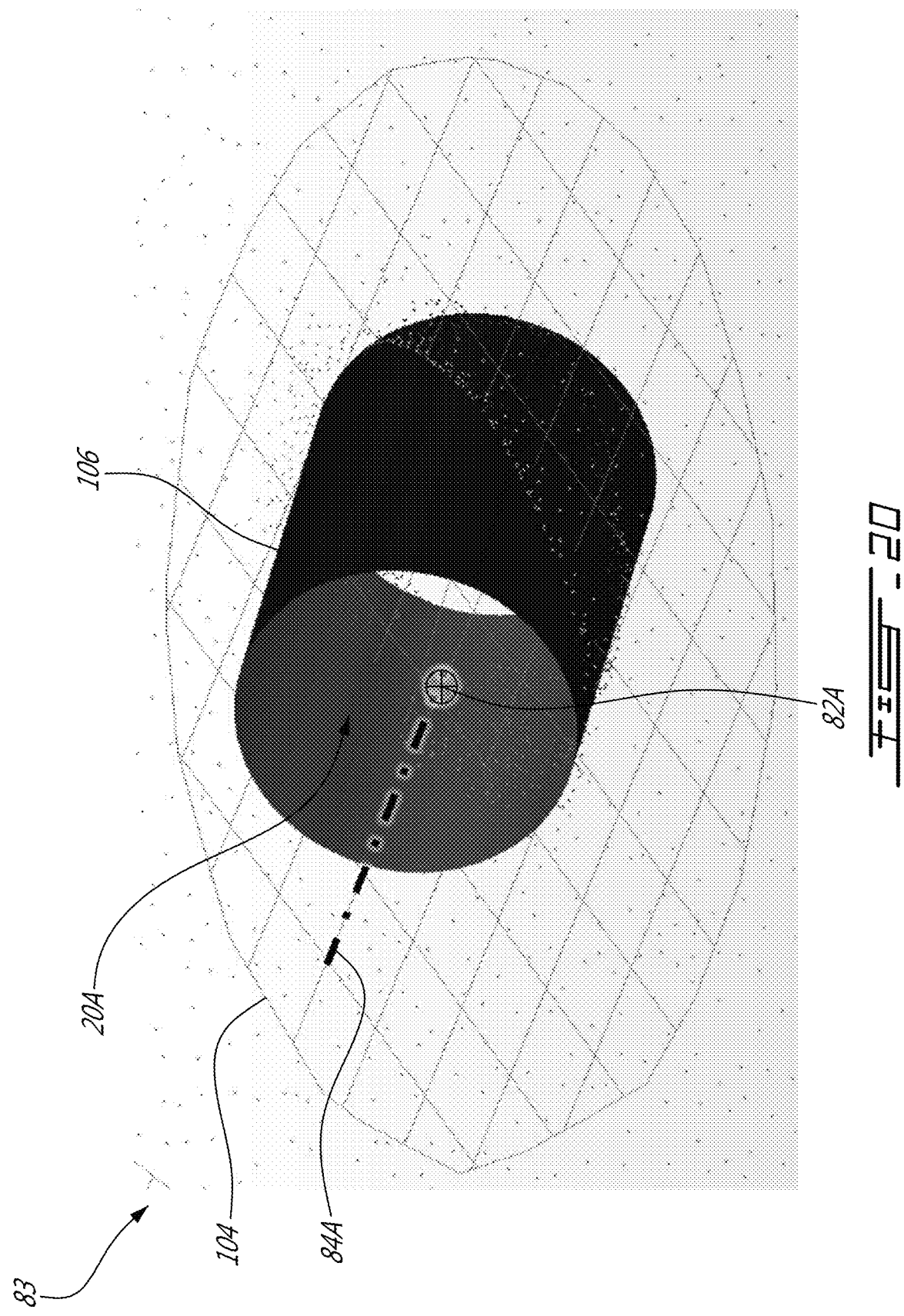

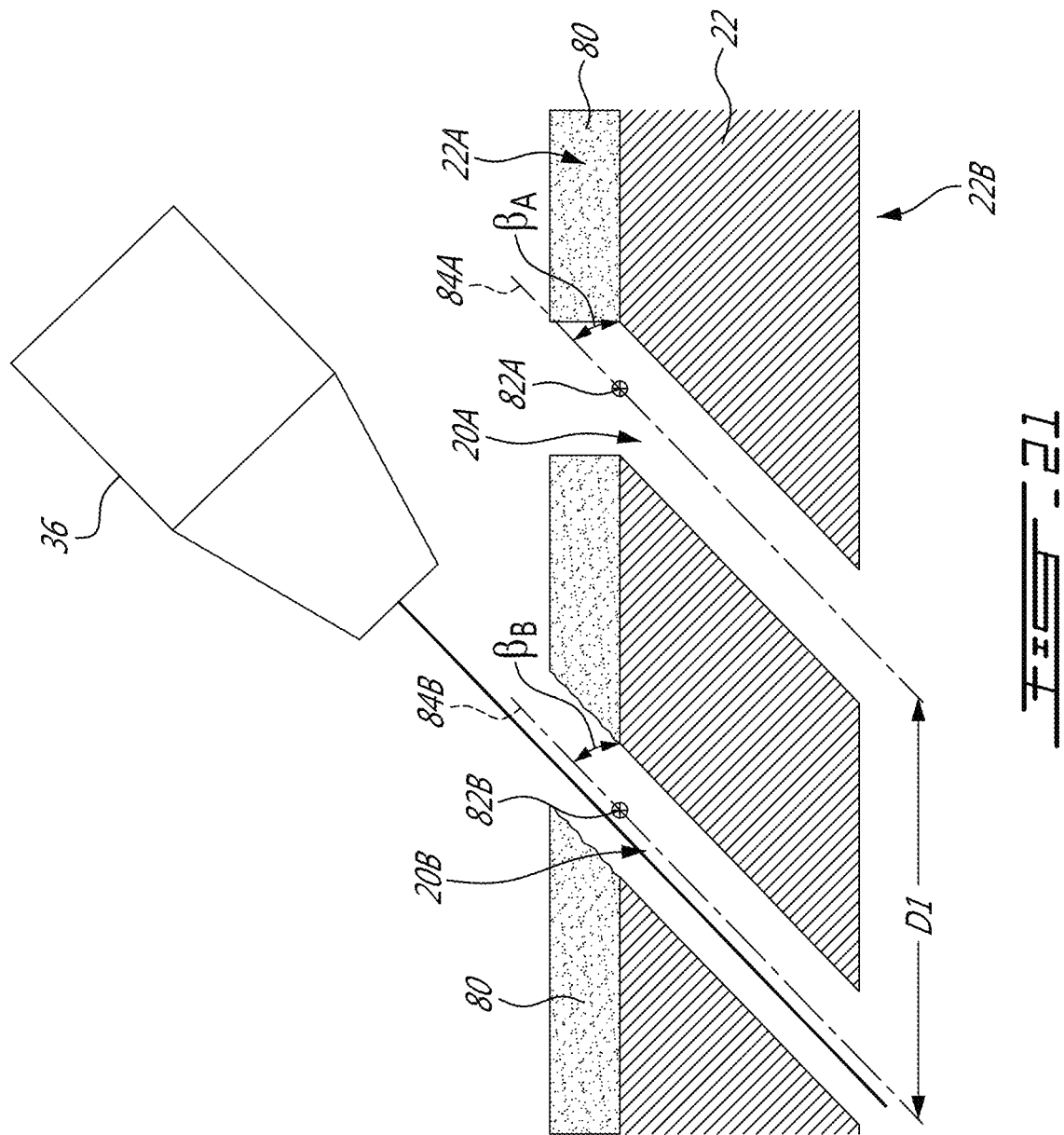

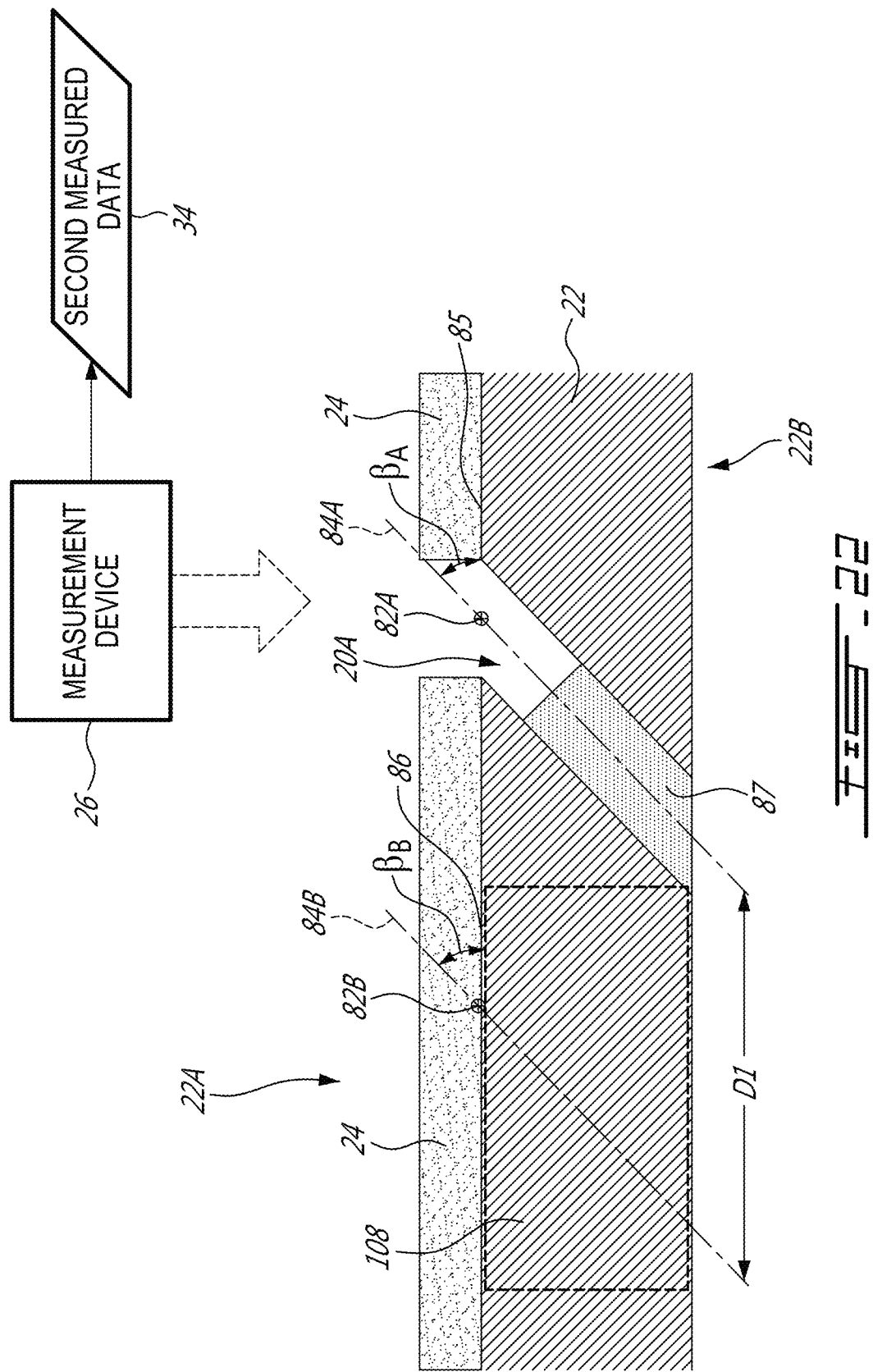

METHOD OF REPAIRING A COMBUSTOR LINER OF A GAS TURBINE ENGINE

TECHNICAL FIELD

The disclosure relates generally to repairing parts, and more particularly to repairing coated perforated parts such as combustor liners of gas turbine engines.

BACKGROUND

A liner of a combustion chamber of a gas turbine engine can include a plurality of effusion holes extending therethrough that facilitate the generation of a layer of cooling air that protects the liner from relatively high temperatures exhibited inside the combustion chamber. The effusion holes are sized and distributed on the liner so that the flow of cooling air through the liner provides the desired cooling. Such a liner can also include a thermal barrier coating (TBC) to further protect the liner from the high temperature environment inside the combustion chamber. During service, the TBC can eventually become damaged and its protective function can become compromised. Replacing the liner with a new liner can be costly. Improvement is desirable.

SUMMARY

In one aspect, the disclosure describes a method of repairing a combustor liner of a gas turbine engine. The method comprises:
  removing an existing coating material from the combustor liner;
  acquiring first measured data indicative of a geometry of the combustor liner in an uncoated state;
  using the first measured data, determining:
    a first location and a first orientation of a first hole in the combustor liner with the combustor liner in the uncoated state; and
    a first location and a first orientation of a second hole in the combustor liner with the combustor liner in the uncoated state;
  applying a new coating material on the combustor liner so that the first hole is substantially unobstructed by the new coating material and the second hole is at least partially obstructed by the new coating material;
  acquiring second measured data indicative of a geometry of the combustor liner in a coated state;
  using the second measured data, determining a second location of the first hole with the combustor liner in the coated state;
  inferring a second location of the second hole with the combustor liner in the coated state using:
    the second location of the first hole; and
    a spacing between the first location of the first hole and the first location of the second hole;
  determining the second orientation of the second hole with the combustor liner in the coated state based on the first orientation of the second hole; and
  drilling through the coating material at least partially obstructing the second hole using the second location and the second orientation of the second hole.

In another aspect, the disclosure describes a method of characterizing holes in a perforated part in preparation for repair. The method comprises:
  receiving first measured data indicative of a geometry of the part in an uncoated state;
  using the first measured data, determining:
    a first location and a first orientation of a first hole in the combustion liner with the part in the uncoated state; and
    a first location and a first orientation of a second hole in the part with the part in the uncoated state;
  receiving second measured data indicative of a geometry of the part in a coated state where the first hole is substantially unobstructed by a coating material and the second hole is at least partially obstructed by the coating material;
  using the second measured data, determining a second location of the first hole with the part in the coated state;
  inferring a second location of the second hole with the part in the coated state using:
    the second location of the first hole; and
    a spacing between the first location of the first hole and the first location of the second hole;
  determining the second orientation of the second hole with the part in the coated state based on the first orientation of the second hole; and
  constructing a data set including data indicative of the second location and second orientation of the second hole.

In a further aspect, the disclosure describes a system for characterizing holes in a perforated part in preparation for repair. The system comprises:
  one or more data processors; and
  non-transitory machine-readable memory storing instructions executable by the one or more data processors and configured to cause the one or more data processors to.
    using first measured data indicative of a geometry of the part in an uncoated state, determine:
      a first location and a first orientation of a first hole in the combustion liner with the part in the uncoated state; and
      a first location and a first orientation of a second hole in the part with the part in the uncoated state;
    using second measured data indicative of a geometry of the part in a coated state where the first hole is substantially unobstructed by a coating material and the second hole is at least partially obstructed by the coating material, determine a second location of the first hole with the part in the coated state;
    inferring a second location of the second hole with the part in the coated state using:
      the second location of the first hole; and
      a spacing between the first location of the first hole and the first location of the second hole;
    determine the second orientation of the second hole with the part in the coated state based on the first orientation of the second hole; and
    construct a data set including data indicative of the second location and second orientation of the second hole.

Further details of these and other aspects of the subject matter of this application will be apparent from the detailed description included below and the drawings.

DESCRIPTION OF THE DRAWINGS

Reference is now made to the accompanying drawings, in which:

FIG. 13 is a table showing the first measured data of FIG. 5 containing first data points and second data points;

FIG. 14 is a graphical representation of a portion of the first measured data of FIG. 5 fitted to a portion of the nominal geometric data of FIG. 8;

FIG. 15 is a graphical representation of a portion of the first measured data of FIG. 5, a first plane representation, a second plane representation, a first cylinder representation and a second cylinder representation;

FIG. 16 is a schematic illustration of a measurement device of the system of FIG. 4 acquiring second measured data indicative of a geometry of the part a coated state, from a coated side of the part;

FIG. 17 is a schematic illustration of a measurement device of the system of FIG. 4 acquiring second measured data indicative of the geometry of the coated part, from an uncoated side of the part;

FIG. 18 is a flow diagram illustrating an exemplary method for determining a second location and a second orientation of the first hole and a second location and a second orientation of the second hole in the coated part;

FIG. 19 is a table showing the second measured data of FIGS. 16 and/or 17 containing first data points and second data points;

FIG. 20 shows a graphical representation of a portion of the second measured data of FIGS. 16 and/or 17, a plane representation and a cylinder representation;

FIG. 21 shows a laser drilling system of the system of FIG. 4 being used to drill through coating material at least partially obstructing a hole in the coated part; and FIG. 22 is a schematic illustration of a measurement device of the system of FIG. 4 acquiring second measured data of a coated part that contains a repair patch.

DETAILED DESCRIPTION

The following disclosure relates to methods and systems for repairing a combustor liner of a gas turbine engine or other coated parts that have holes extending therethrough. The methods and systems disclosed herein may be particularly useful when the combustion liner has deformed from service and/or deformed from a coating process during repair. Repairing the combustion liner may require characterizing one or more effusion (cooling) holes in the combustion liner before and after the coating process. In some situations, one or more effusion holes in the combustion liner may be at least partially obstructed (blocked) by the protective coating applied on the combustion liner and may need to be re-drilled.

The methods and systems described herein may facilitate the characterization of such effusion holes in the combustion liner that are at least partially obstructed by the coating to permit subsequent (e.g., laser) drilling. In some embodiments, the method disclosed herein can include removing a damaged coating on the combustion liner, applying a new coating on the combustion liner and also drilling through one or more at least partially blocked effusion holes. In some embodiments, the methods disclosed herein can reduce scrap material and repair costs by reusing the base material of the part instead of having to replace the part entirely. Aspects of various embodiments are described through reference to the drawings.

The term "substantially" as used herein may be applied to modify any quantitative representation which could permissibly vary without resulting in a change in the basic function to which it is related.

Figure 1:
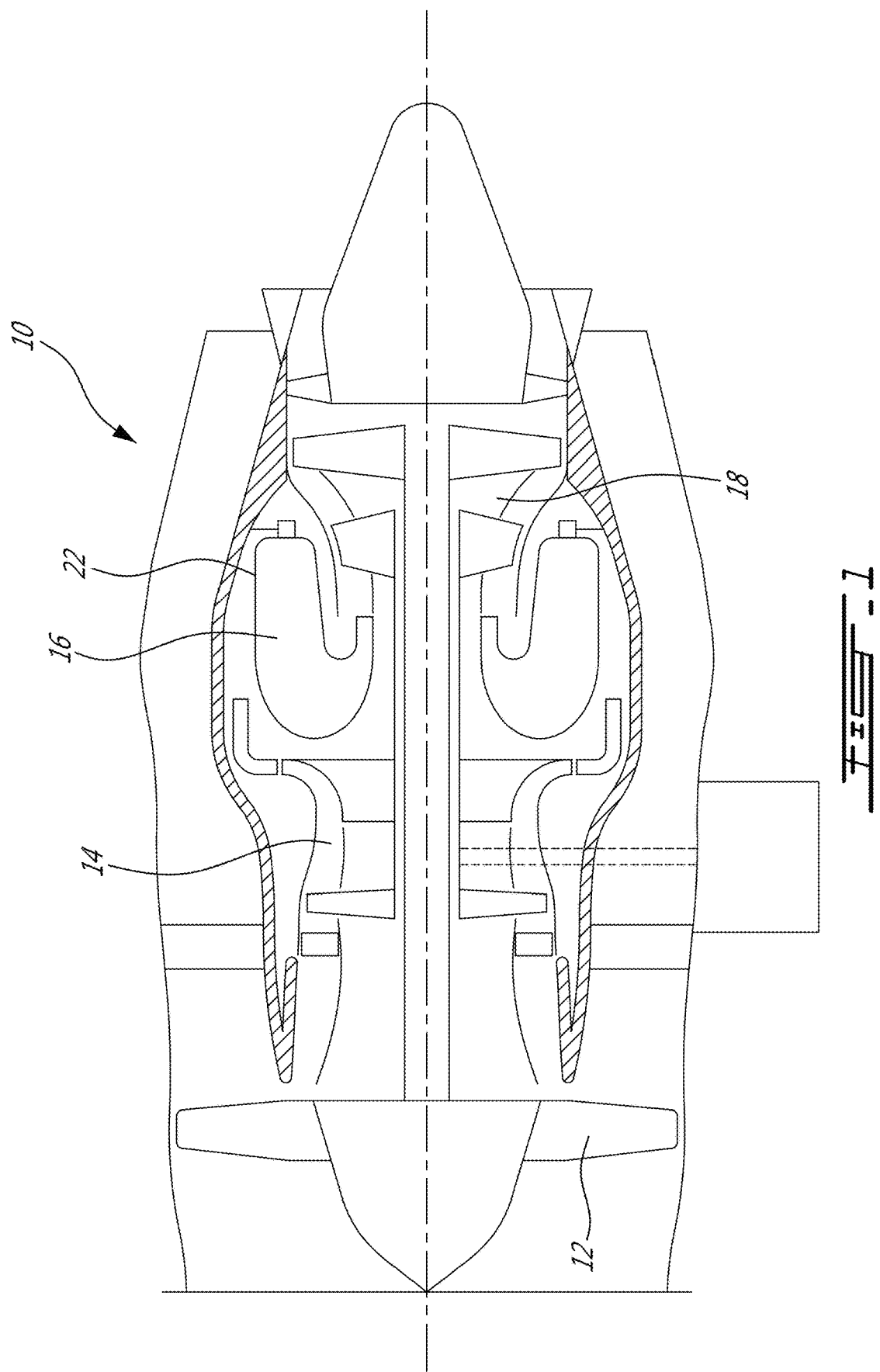
FIG. 1 is an axial cross-section view of a turbofan gas turbine engine including a part that can be repaired using methods and systems described herein.

FIG. 1 illustrates gas turbine engine 10 of a type preferably provided for use in subsonic flight, generally comprising in serial flow communication fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases. The methods disclosed herein can be used to repair part 22 (e.g., combustor liner) of engine 10 or other types of perforated components that can require a thermal barrier coating (TBC) or other type(s) of coating.

Figure 2:
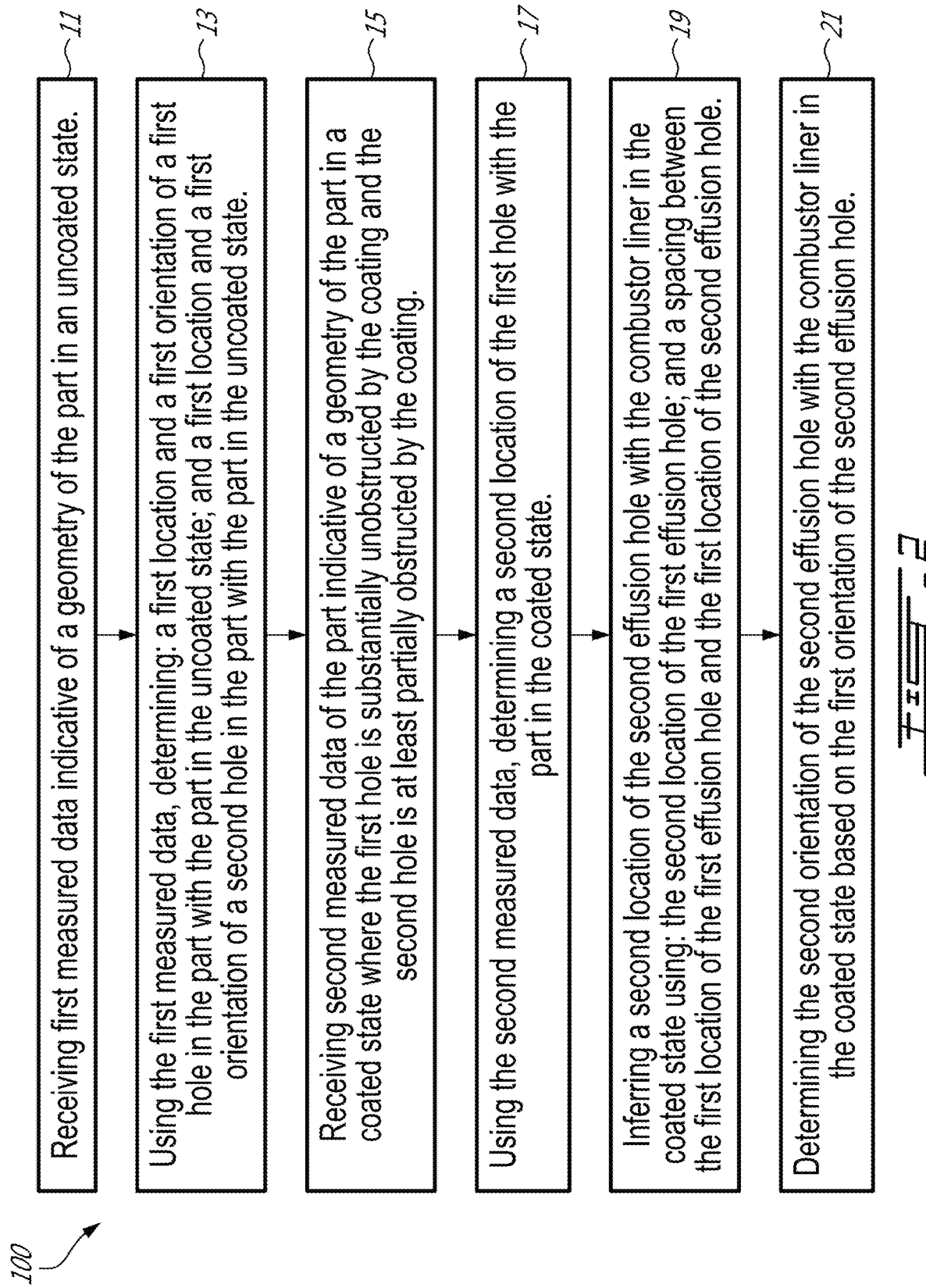
FIG. 2 is a flow diagram illustrating an exemplary method of characterizing holes in a part in preparation for repairing the part.

FIG. 2 is a flowchart of an exemplary method 100 of characterizing holes in apart in preparation for repair. It is understood that aspects of method 100 can be combined with other (e.g., repair) methods described herein. In various embodiments, method 100 includes:

receiving first measured data indicative of a geometry of the part in an uncoated state (block 11);

using the first measured data, determining: a first location and a first orientation of a first hole in the part with the part in the uncoated state; and a first location and a first orientation of a second hole in the part with the part in the uncoated state (block 13);

after a coating process has applied a coating to the part and has optionally caused deformation of the part, receiving second measured data of the part indicative of a geometry of the part in a coated state where the first hole is substantially unobstructed by the coating and the second hole is at least partially obstructed by the coating (block 15);

using the second measured data, determining a second location of the first hole with the part in the coated state (block 17);

inferring a second location of the second effusion hole with the combustor liner in the coated state using: the second location of the first effusion hole; and a spacing between the first location of the first effusion hole and the first location of the second effusion hole (block 19); and determining the second orientation of the second effusion hole with the combustor liner in the coated state based on the first orientation of the second effusion hole (block 21).

Aspects of method 100 are described in further detail below in reference to FIG. 3.

Figure 3:
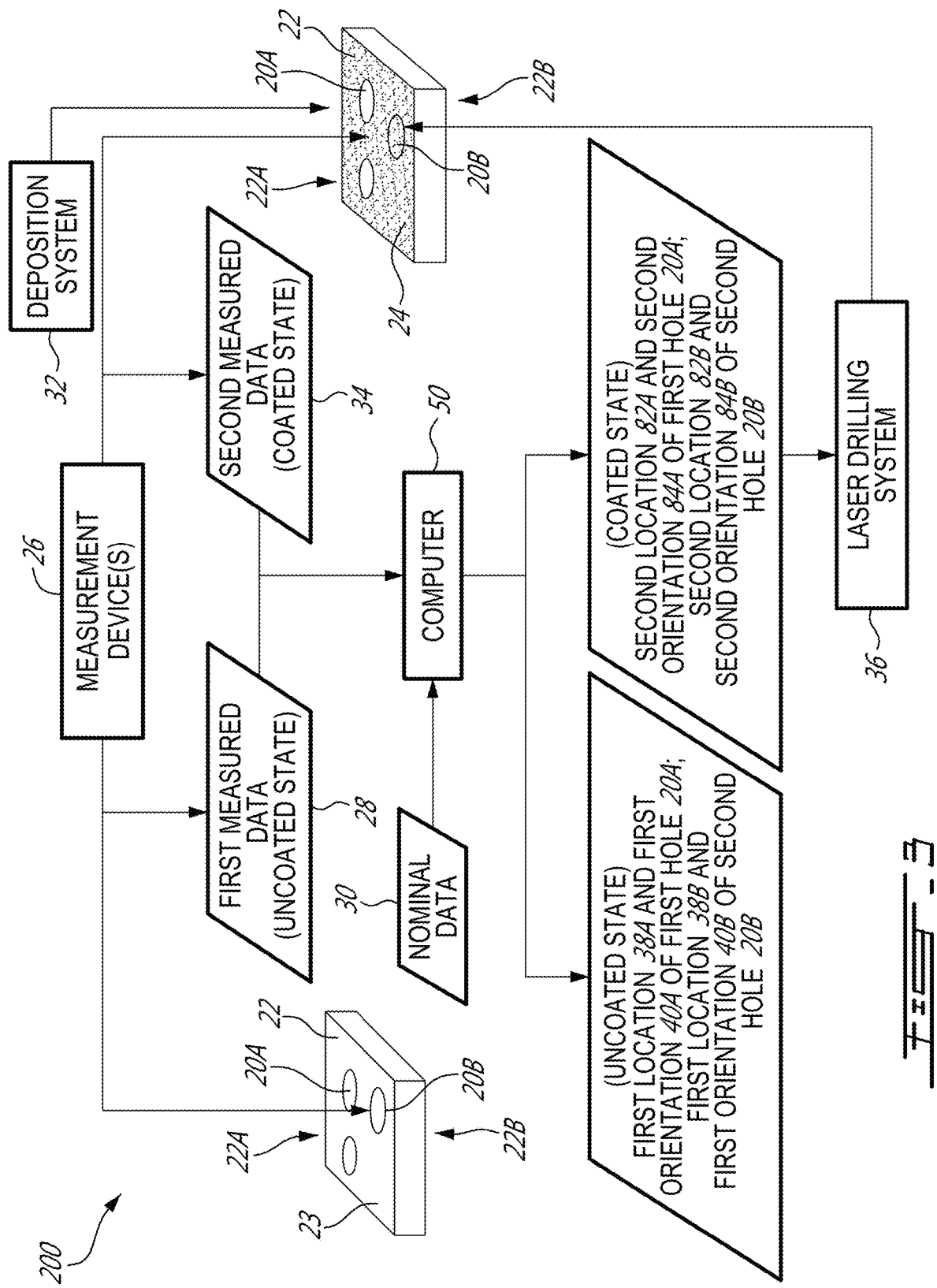
FIG. 3 is a flow diagram illustrating an exemplary method for repairing the part.

FIG. 3 is a flow diagram illustrating an exemplary method 200 for repairing part 22 of gas turbine engine 1. It is understood that aspects of method 200 can be combined with aspects of method 100 and other methods disclosed herein. In various embodiments, part 22 can be, for example, a combustor liner, a combustor shield, a blade or a vane ring of engine 10. Part 22 can have an annular or a non-annular configuration. Part 22 may have a curved or substantially planar geometry. Part 22 may have a sheet form. Part 22 may contain one or more holes such as first hole 20A and second hole 20B (referred generically herein as "holes 20") extending therethrough.

In some embodiments, where part 22 is a combustor liner for example, holes 20 can be effusion cooling holes through which some of the compressed air enters combustor 16 during operation of engine 10. The individual sizes, orientations and distribution (e.g., spacing and pitch) of holes 20 through part 22 can be configured to provide a desired flow rate of air into combustor 16 and also protect combustor 16 from the elevated temperatures associated with the combustion process. Holes 20 can be (e.g., laser) drilled through part 22 at normal or oblique (i.e., non-normal) angles relative to respective surfaces of part 22 through which respective holes 20 extend. Holes 20 can extend linearly across the thickness of part 22. During operation of the combustor liner, the air can flow through holes 20 and form a film cooling layer along first (e.g., inner) side 22A of part 22 via a process known as effusion cooling. Accordingly, the configuration of holes 20 can be selected (e.g., calibrated) based on air flow requirements to provide a desired cooling effect on part 22. In some embodiments, part 22 can be initially manufactured according to the teachings of U.S. Pat. No. 8,578,581 entitled METHOD OF MAKING A PART AND RELATED SYSTEM, which is incorporated herein by reference.

Part 22 can be made from a suitable metallic material such as a nickel-based alloy for example selected based on the environmental conditions to which part 22 is exposed. In some embodiments, part 22 can be in the form of a relatively thin sheet formed to the desired geometry. Part 22 can comprise coating 24 bonded thereto for providing further protection against the elevated temperatures to which part 22 can be exposed.

Coating 24 can be applied and bonded to one side (e.g., first side 22A) of part 22 which is directly exposed to the hot gasses produced by the combustion process. For example, first side 22A of part 22 can be facing the combustion process during operation of engine 10. Coating 24 may be a TBC. It is understood that aspects of this disclosure are applicable to parts 22 having other types of coatings as well. TBC can, for example, comprise a suitable MCrAlY material which can offer thermal and corrosion protection and where M denotes nickel, cobalt, iron or mixtures thereof; Cr denotes chromium; Al denotes aluminium; and Y denotes yttrium. TBC can comprise a ceramic layer applied on top of the MCrAlY layer to provide further thermal protection. An example of such ceramic coating material is yttria stabilised zirconia (YSZ) which can be applied on top of the MCrAlY layer. The MCrAlY and ceramic protective coatings can be applied on part 22 using a suitable deposition system 32. The MCrAlY and ceramic protective coatings can be applied by physical vapour deposition (PVD), chemical vapour deposition (CVD) or plasma spraying means for example.

During service, part 22 can be subjected to cyclic exposure to relatively harsh environmental conditions (e.g., hot combustion gasses) and degradation of an existing coating on part 22 can occur over time. For example, portions of the existing coating can become cracked and/or some portions of the existing coating can become removed from part 22 and thereby expose the underlying metallic material of part 22. Instead of having to replace part 22 entirely, the methods disclosed herein can be used to repair part 22 by reusing the base material without significantly altering the configuration of holes 20 and hence without significantly altering the (e.g., calibrated) air flow conditions across part 22. An existing coating that has been cracked and/or damaged can be replaced by new coating 24.

In various embodiments, method 200 can be used to clear one or more holes 20 that may have been at least partially obstructed by the application of coating 24 on part 22.

Method 200 may comprise receiving part 22 in a state where an existing coating on part 22 is damaged. Method 200 can include removing the existing coating on part 22. The removal of the existing coating can comprise sandblasting or grinding for example.

Method 200 may include acquiring first measured data 28 indicative of a geometry of part 22 with part 22 in an uncoated state. First measured data 28 may include a plurality of 3-dimensional data points that represent various points on a surface of part 22 with part 22 in the uncoated state.

Figure 5:
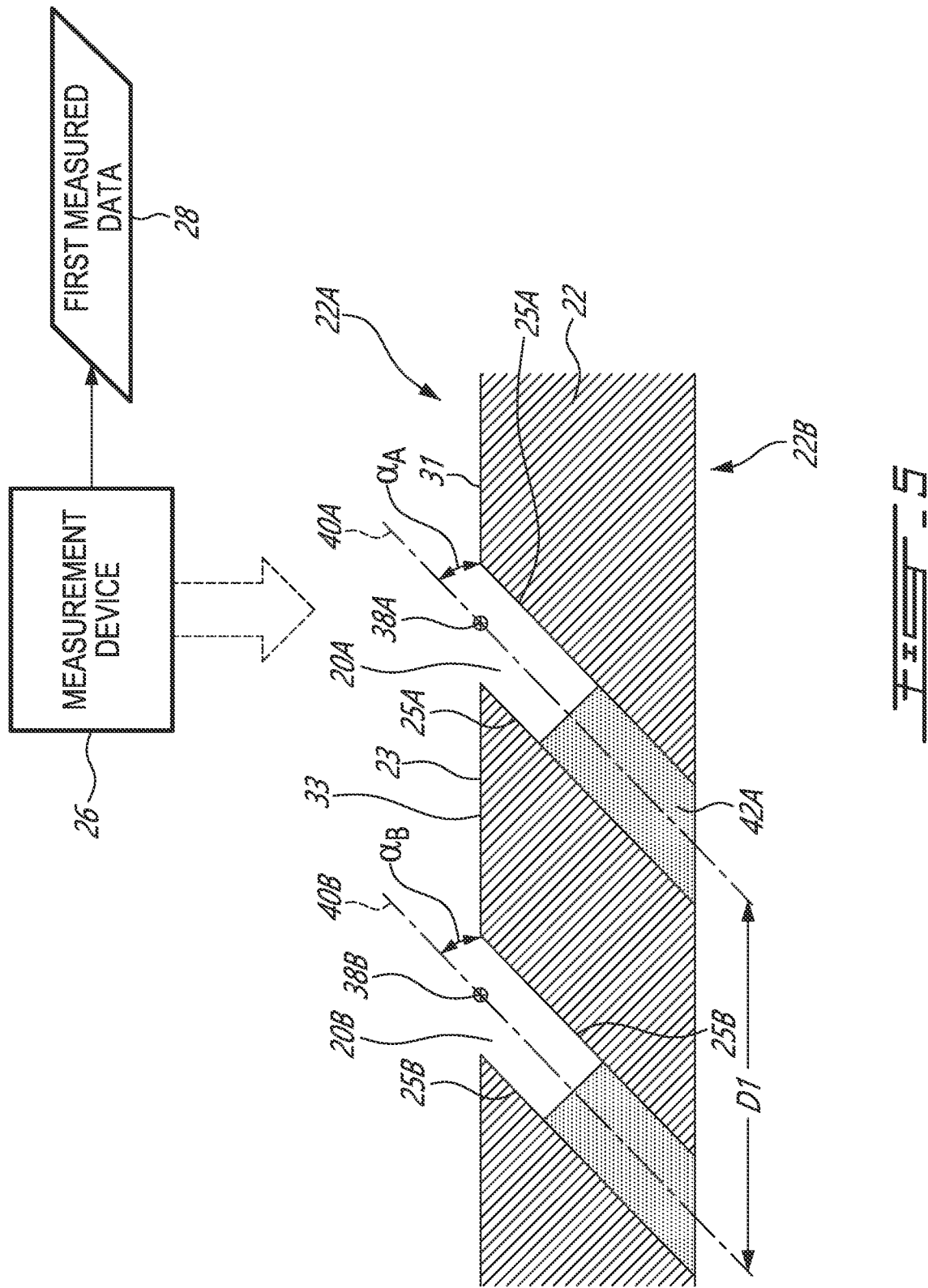
FIG. 5 is a schematic illustration of a measurement device of the system of FIG. 4 acquiring first measured data indicative of a geometry of the part in an uncoated state.
Figure 6:
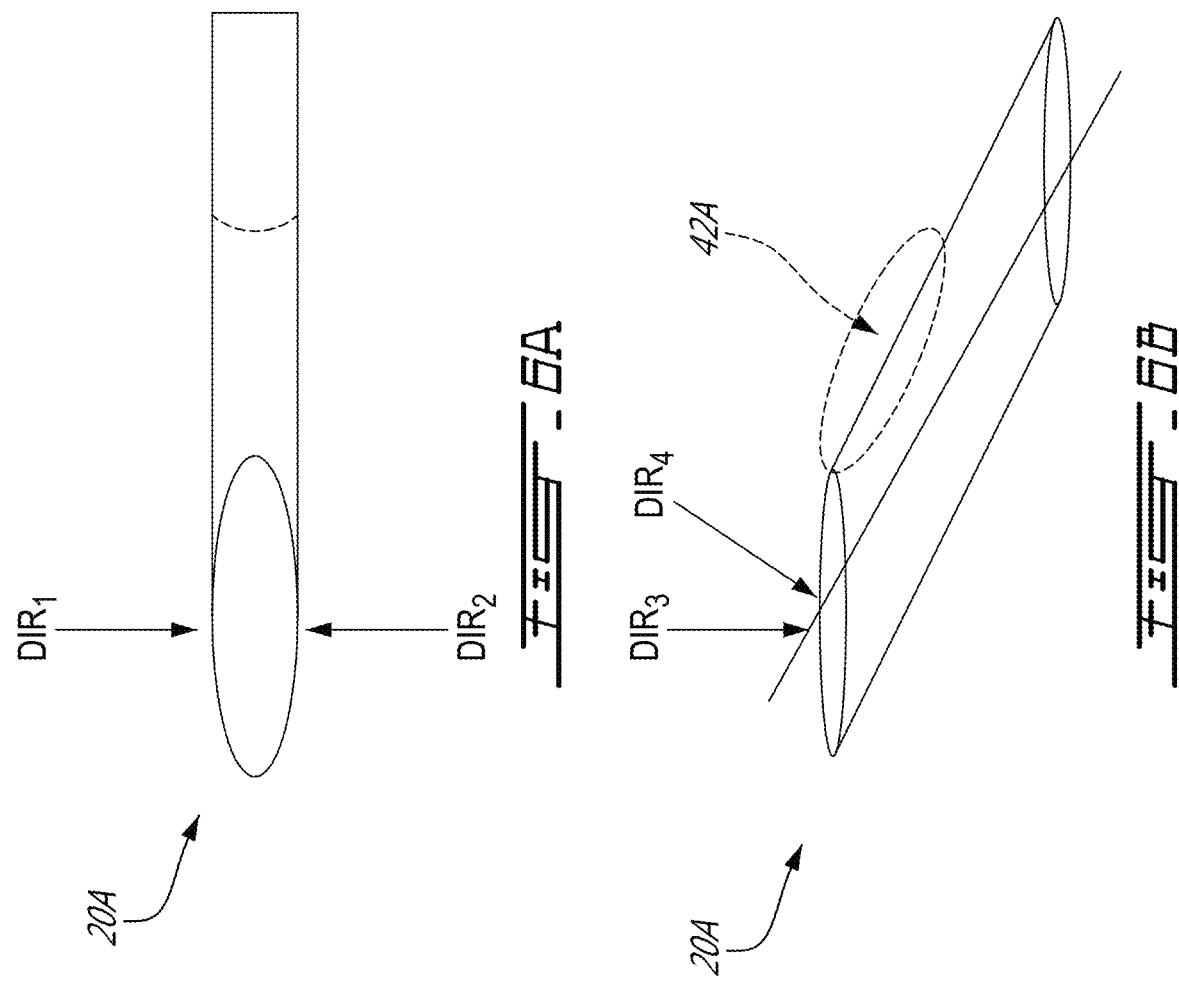
FIG. 6A shows a top view of an exemplary hole in a part.
FIG. 6B shows a front view of the hole of FIG. 6A.

Method 200 may include using the first measured data to determine first location 38A and first orientation 40A of first hole 20A in part 22 (as shown in FIG. 5) and first location 38B and first orientation 40B of second hole 20B in part 22 (as shown in FIG. 5) with part 22 in the uncoated state. In some embodiments, determining first location 38A and first orientation 40A of first hole 20A and first location 38B and first orientation 40B of second hole 20B may include additionally using nominal data 30 indicative of a nominal geometry of part 22. Nominal data 30 may be a digital representation (e.g., data points, lines, surfaces, solid models) such as computer aided design (CAD) model from which part 22 was initially manufactured.

Method 200 may include, after a coating process has applied coating 24 on part 22 and has optionally caused deformation of part 22, acquiring second measured data 34 indicative of a geometry of part 22 in a coated state where first hole 20A is substantially unobstructed by coating 24 and second hole 20B is at least partially obstructed by coating 24. Second measured data 34 may include a plurality of data points that represent various points on a surface of part 22 with part 22 in the coated state.

Method 200 may include using second measured data 34 to determine second location 82A and optionally second orientation 84A of first hole 20A in part 22 with part 22 in the coated state (as shown in FIG. 16). In some embodiments, determining second location 82A and second orientation 84A of first hole 20A may include additionally using first measured data 28.

Method 200 may include inferring second location 82B of second hole 20B (as shown in FIG. 16) with part 22 in the coated state using: second location 82A first hole 20A; and a known spacing $D_1$ (as shown in FIG. 5) between first hole 20A and second hole 20B determined from nominal data or from the first measured data 28 of part 22 in an uncoated state. Spacing $D_1$ (shown in FIG. 5) may represent a distance and a direction between hole 20A and second hole 20B. Determining second orientation 84B of second hole 20B may include using first orientation 40B of second hole 20B. In some embodiments, determining second orientation 84B of second hole 20B may includes assigning first orientation 40B of second hole 20B as second orientation 84B of second hole 20B. Alternatively, second orientation 84B of second hole 20B may include an adjustment of first orientation 40B of second hole 20B based on a difference between first orientation 40A of first hole 20A and second orientation 84A of first hole 20A.

Method 200 may include (e.g., laser, mechanical) drilling through coating 24 at least partially obstructing second hole 20B using second location 82B and second orientation 84B of second hole 20B.

Even though aspects of the methods disclosed herein are described in relation to first hole 20A and second hole 20B for clarity, it is understood that the methods disclosed herein can be used with a plurality (e.g., 10's, 100's or 1000's) of holes 20 that extend through part 22. Aspects of methods 100 and 200 are further described below in reference to FIGS. 4-22.

Figure 4:
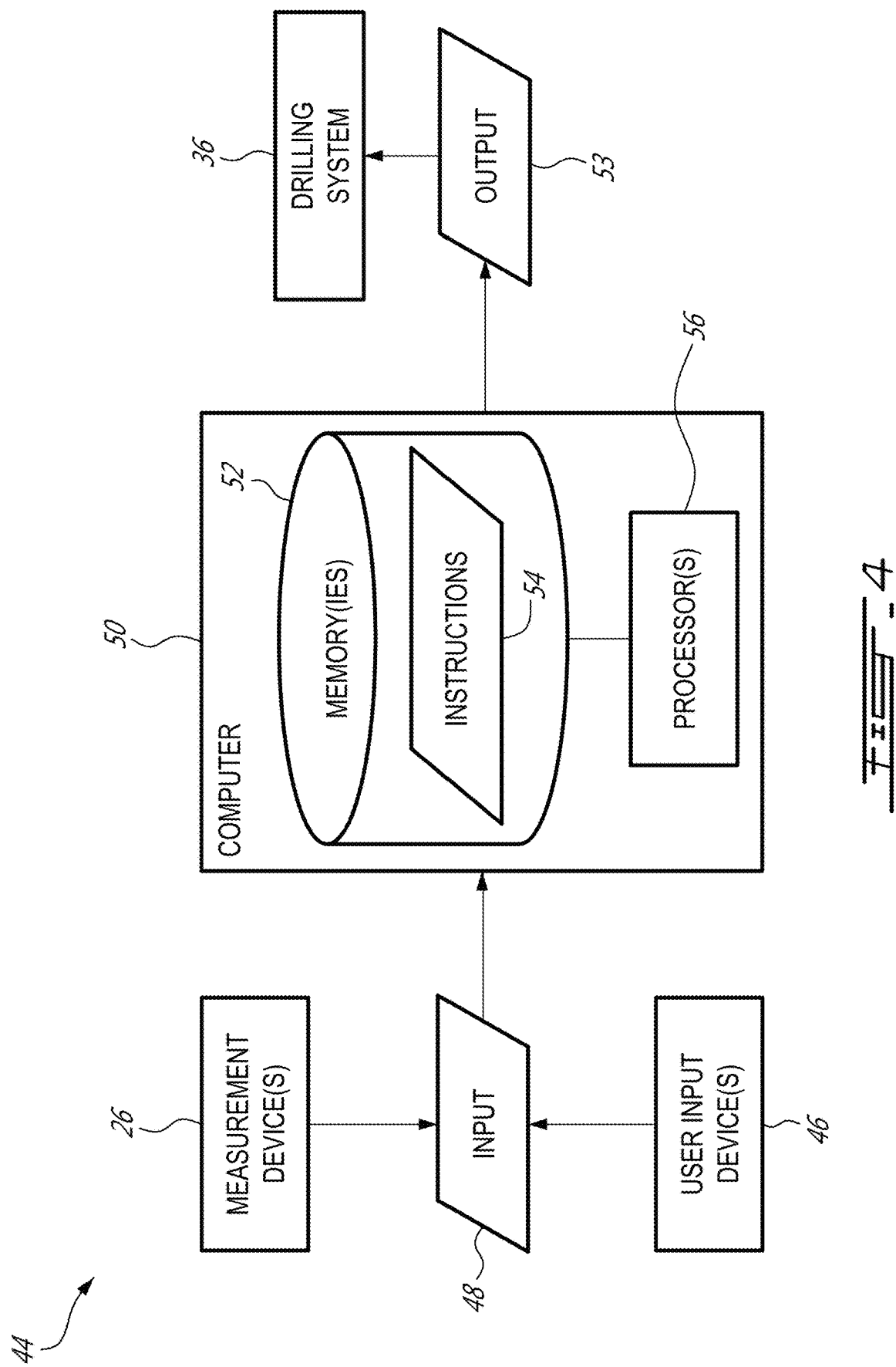
FIG. 4 is a schematic illustration of an exemplary embodiment of a system for repairing the part.

FIG. 4 is a schematic illustration of an exemplary embodiment of system 44 for characterizing effusion holes 20 in part 22 and optionally also repair part 22 of gas turbine engine 10. System 44 may include computer 50, one or more measurement devices 26 (referred hereinafter in the singular), one or more user input devices 46 (e.g., keyboard, mouse) (referred hereinafter in the singular) and (e.g., laser or other type of) drilling system 36. Computer 50 may be configured to receive input 48 (i.e. signals, data) from measurement device 26 and/or user input device 46 via one or more communication terminals/ports. Computer 50 may include one or more data processors 56 (referred hereinafter in the singular) and one or more computer-readable memories 52 (referred hereinafter in the singular) storing machine-readable instructions 54 executable by data processor 56 and configured to cause data processor 56 to generate output 53 (e.g. signals, data) for causing the execution of one or more steps of the methods described herein. Computer 50 may be configured to generate output 53 for controlling drilling system 36. For example, output 53 may include a data set constructed by computer 50. Output 53 may be stored in memory 52 or other non-transitory computer readable storage medium. Output 53 may include data indicative of the location and orientation of one or more at least partially obstructed effusion hole(s) 20. Output 53 may include a digital representation of numerical values indicative of a characterization of one or more holes 20. For example, output 53 may include three-dimensional positional coordinates (e.g., x, y, z) and a directional vector (e.g., i, j, k) associated with one or more holes 20. In situations where part 22 is planar and holes 20 of interest all have the same orientation, two-dimensional positional coordinates (e.g., x, y) of hole(s) 20 may be sufficient and a directional vector may not be required. In some embodiments, output 53 may be a digital CAD model. In some embodiments, output 53 may include computer numerical control (CNC) commands or otherwise be usable for controlling the operation of drilling system 36.

Data processor 56 may include any suitable device(s) configured to cause a series of steps to be performed by computer 50 so as to implement a computer-implemented process such that instructions 54, when executed by computer 50 or other programmable apparatus, may cause the functions/acts specified in the methods described herein to be executed. Data processor 56 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 52 may include any suitable machine-readable storage medium. Memory 52 may include non-transitory computer readable storage medium such as, for example, but not limited to, an electronic, magnetic, optical, electromagnetic, infrared, or semiconductor system, apparatus, or device, or any suitable combination of the foregoing. Memory 52 may include a suitable combination of any type of computer memory that is located either internally or externally to computer 50. Memory 52 may include any storage means (e.g. devices) suitable for retrievably storing machine-readable instructions 54 executable by data processor 56.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 52) having computer readable program code (e.g., instructions 54) embodied thereon. Computer program code for carrying out operations for aspects of the present disclosure in accordance with instructions 54 may be written in any combination of one or more programming languages. Such program code may be executed entirely or in part by computer 50 or other data processing device(s). Based on the present disclosure, one skilled in the relevant arts could readily write computer program code for implementing the methods described herein.

FIG. 5 schematically illustrates the acquisition of first measured data 28 using measurement device 26 of system 44 when part 22 is in an uncoated state. Measurement device 26 may be configured to 3-dimensionally (3D) scan first side 22A of part 22 to obtain first measured data 28. In some embodiments, measurement device 26 may be configured to only scan a portion of first side 22A that is proximate holes 20. Although, measurement device 26 is depicted as scanning first side 22A of part 22, it should be understood that measurement device 26 may also acquire first measured data 28 of part 22 by alternatively or additionally scanning second side 22B of part 22.

First location 38A of first hole 20A may be indicative of a location of a central axis of first hole 20A on first side 22A of part 22 when part 22 is in the uncoated state. First location 38B of second hole 20B may be indicative of a location of a central axis of second hole 20B on first side 22A of part 22 when part 22 is in the uncoated state. As depicted, first location 38A of first hole 20A is spaced apart from first location 38B of second hole 20B by spacing $D_1$. First orientation 40A of first hole 20A may be indicative of an orientation of the central axis of first hole 20A of part 22 when part 22 is in the uncoated state. First orientation 40B of second hole 20B may be indicative of an orientation of the central axis of second hole 20B of part 22 when part 22 is in the uncoated state. As depicted, the central axis of first hole 20A is oriented at angle A relative to portion 31 of surface 23 of part 22. As depicted, the central axis of second hole 20B is oriented at angle as relative to portion 33 of surface 23 of part 22. In some embodiments, first orientation 40A of first hole 20A may be substantially equal to first orientation 40B of second hole 20B. In this situation, angle A may be substantially equal to angle as. Although first hole 20A is shown as being directly adjacent to second hole 20B, it should be understood that first hole 20A does not have to be directly adjacent to second hole 20B.

Measurement device 26 may be controlled during scanning to obtain the required measurement readings (i.e. data points) for determining first location 38A and first orientation 40A of first hole 20A and first location 38B and first orientation 40B of second hole 20B. In some embodiments, measurement device 26 may be manually controlled by an operator. In some embodiments, measurement device 26 may be operatively controlled using computer 50 (not shown in FIG. 4) or other system. Computer 50 may be configured to control a position and/or orientation of measurement device 26 via a suitable motion system. In some embodiments, measurement device 26 may be controlled by a combination of computer 50 and an operator.

As illustrated in FIGS. 6A and 6B, an orientation of measurement device 26 can be adjusted during scanning to obtain first measured data 28. As depicted, measurement device 26 is oriented to scan in first direction $DIR_1$, second direction $DIR_2$, third direction $DIR_3$ and fourth direction $DIR_4$ to acquire the measurement readings (i.e. data points) necessary to determine first location 38A and first orientation 40A of first hole 20A. In some cases, measurement device 26 may be incapable of acquiring measurement readings within undetectable (blind) region 42A. Measurement device 26 may be limited to scanning part 22 only on first side 22A of part 22 due to accessibility constraints thereby preventing the acquisition of measurement readings within undetectable region 42A. Part 22 may be oriented such that access is only provided to measurement device 26 on first side 22A of part 22. As depicted, undetectable region 42A is a portion of first hole 20A that is distant from surface 25A of part 22. In alternative embodiments, part 22 may be oriented such that measurement device 26 is only capable of scanning part 22 on second side 22B of part 22.

First measured data 28 may be acquired using any suitable type of measurement device 26. In some embodiments, measurement device 26 can comprise a non-contact measurement device. For example, measurement device 26 can comprise an optical (e.g., laser, blue light, white light) 3D scanner. The 3D scanner may be a portable handheld scanner that is easy to manipulate such as a HandySCAN AERO-PACK™. In some embodiments, measurement device 26 can be configured for contact measurement and can comprise a suitable coordinate measurement machine (CMM). In some embodiments, a combination of contact and non-contact measuring techniques can be used with the methods disclosed herein.

Figure 7:
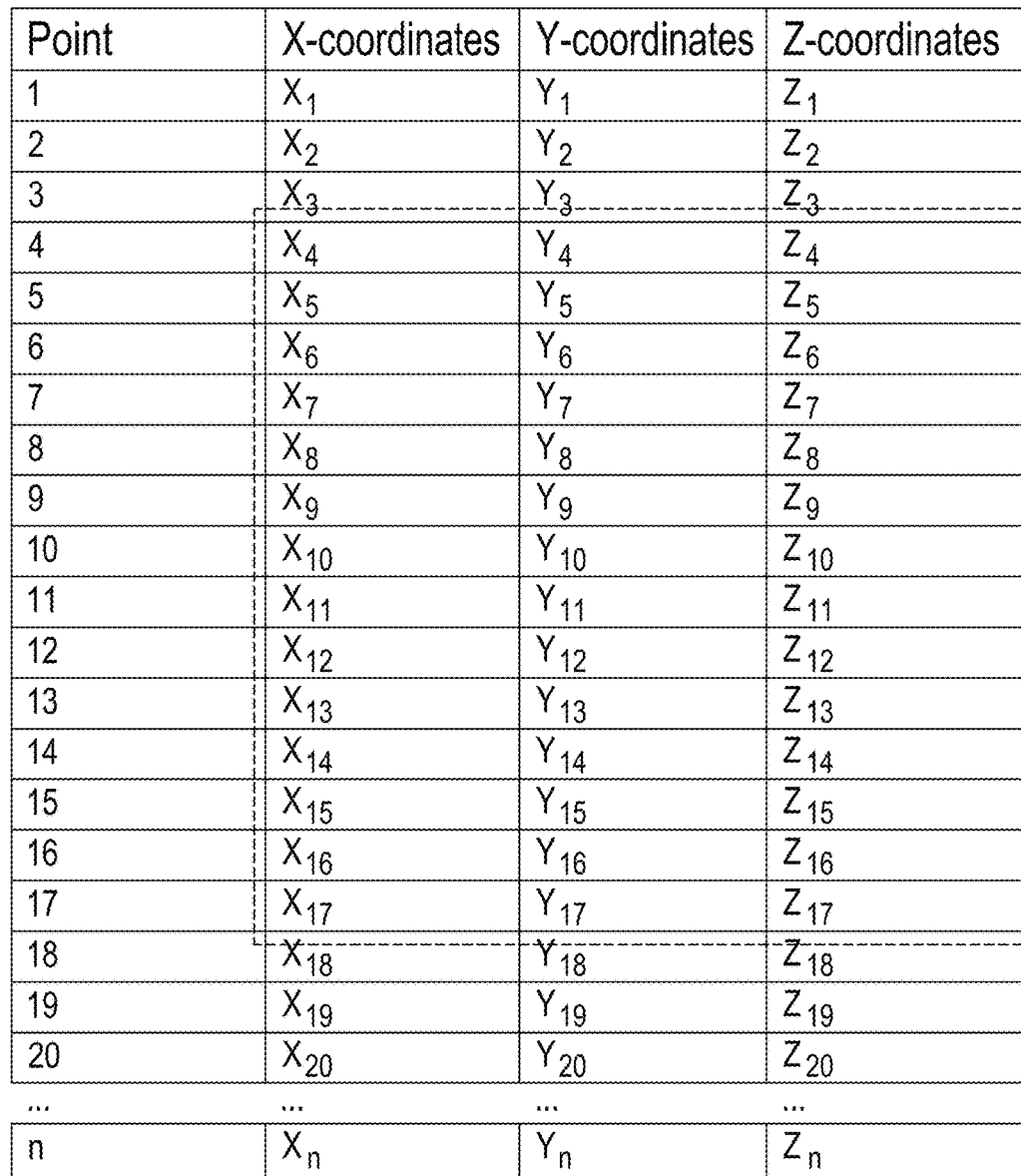
FIG. 7 is a table showing an exemplary format of the first measured data acquired using the measurement device of FIG. 5.
Figure 9:
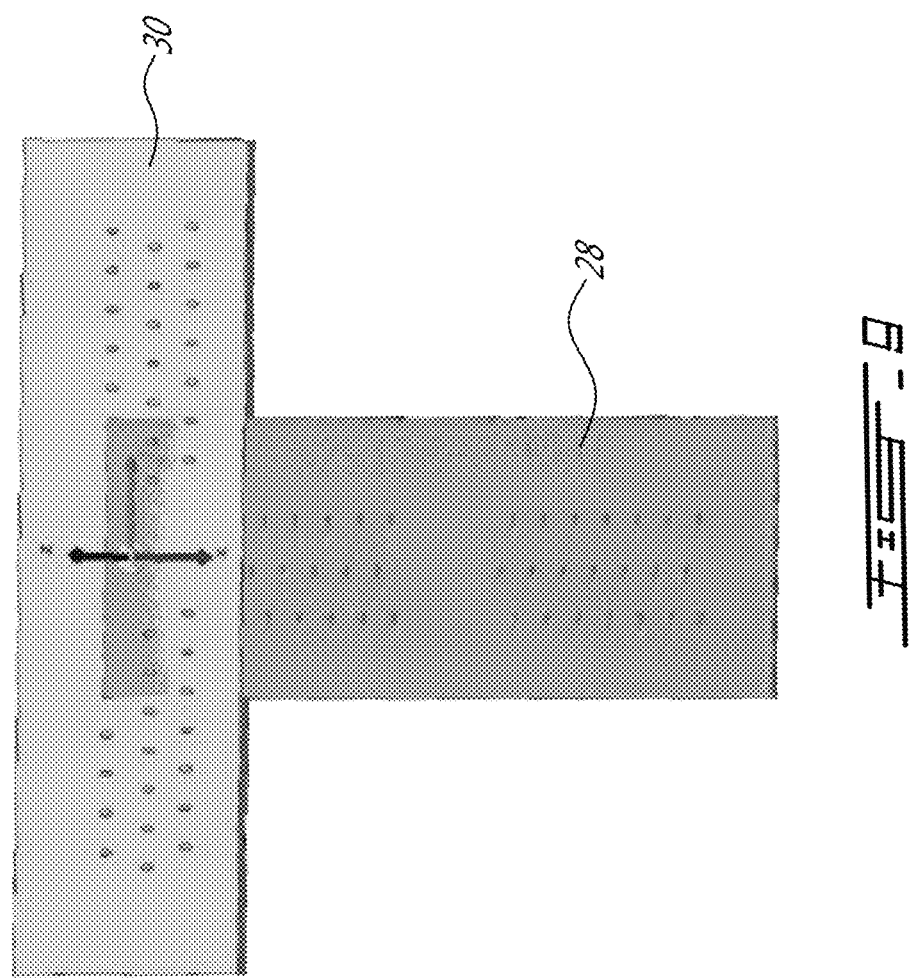
FIG. 9 is a graphical representation of the first measured data acquired using the measurement device of FIG. 5 and the nominal geometric data of the part.
Figure 10:
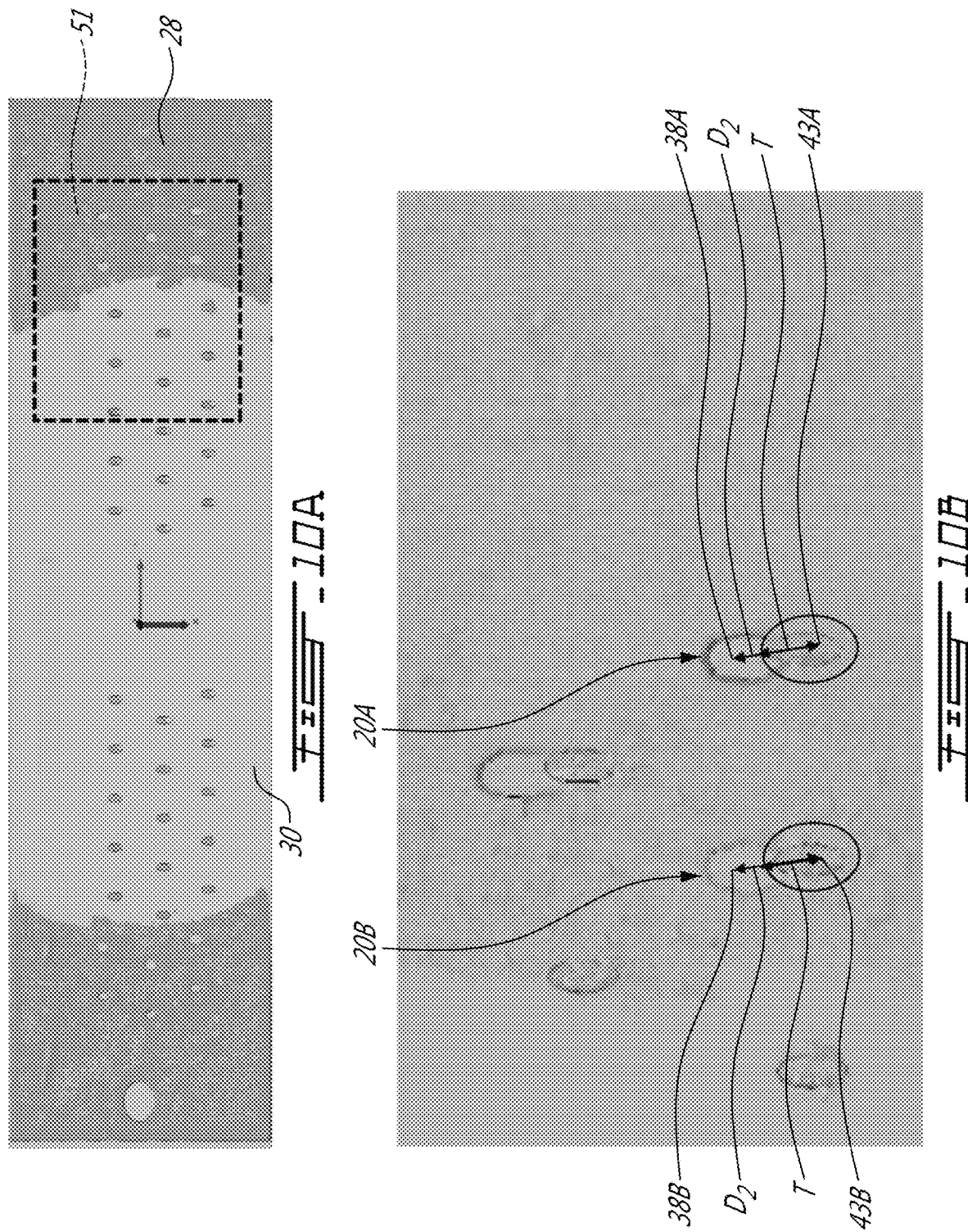
FIG. 10A is a graphical representation of the first measured data acquired using the measurement device of FIG. 5 fitted to the nominal geometric data of the part.
FIG. 10B is a graphical representation of an exemplary portion of the first measured data shown in FIG. 10A fitted to the nominal geometric data of the part.

FIG. 7 is a table showing first measured data 28. First measured data 28 may include a plurality of data points defining x-axis, y-axis and z-axis coordinates of various points on a surface of part 22 with part 22 being in an uncoated state. First measured data 28 may be illustrated as a point cloud showing the various points in space as shown in FIGS. 9 and 10. In some embodiments, a subset of data points in first measured data 28 may be selected manually by an operator or may be determined automatically to define target bounding region 51 within first measured data 28 as graphically shown in FIG. 10A. Target bounding region 51 may define a region in first measured data 28 where a repair is expected to be performed. In some embodiments, target bounding region 51 may include first hole 20A and/or second hole 20B. For example, points 4-15 are illustrated as defining target bounding region 51.

In some embodiments, target bounding region 51 may be determined using nominal data 30. For example, computer 50 may be configured to use nominal location 43A of first hole 20A (as shown in FIG. 10B) and/or nominal location 43B of second hole 20B (as shown in FIG. 10B) obtained using nominal data 30 to determine target bounding region 51 in first measured data 28. In some embodiments, nominal data 30 may be acquired by computer 50 from user input device 46. In some embodiments, nominal data 30 may be stored in memory 52 of computer 50 or otherwise be accessible to computer 50.

Figure 8:
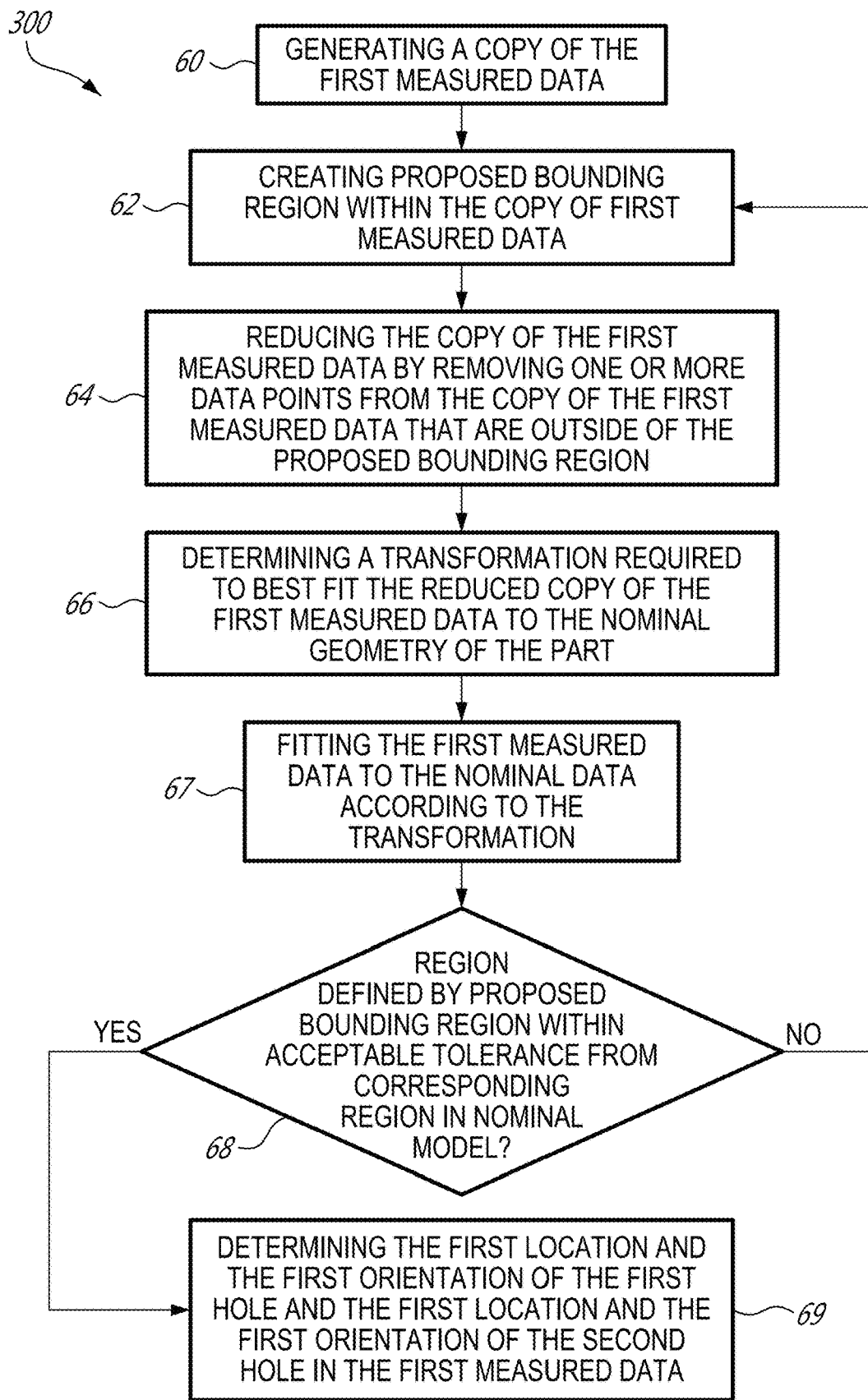
FIG. 8 is a flow diagram illustrating an exemplary method for fitting the first measured data of FIG. 5 with nominal geometric data of the part.

FIG. 8 is a flow diagram illustrating an exemplary method 300 for fitting first measured data 28 with nominal data 30. It is understood that aspects of method 300 may be combined with aspects of other methods described herein. Method 300 may be included in method 200 and may occur after acquiring first measured data 28 and before identifying first location 38A and first orientation 40A of first hole 20A and first location 38B and first orientation 40B of second hole 20B. Aspects of method 300 may be performed with the assistance of suitable metrology software such as POLYWORKS®. Aspects of method 300 are described in reference to FIGS. 9-11 below.

FIG. 9 is a graphical representation showing first measured data 28 and nominal data 30 before fitting first measured data 28 with nominal data 30. As depicted, first measured data 28 is not aligned with nominal data 30.

FIG. 10A is a graphical representation of first measured data 28 fitted to nominal data 30. In some embodiments, method 300 may include performing an initial fitting of first measured data 28 to nominal data 30. Fitting may entail performing a best-fit alignment of first measured data 28 to nominal data 30 according to known or other methods. As depicted, first measured data 28 may include target bounding region 51 (shown in broken lines). In some embodiments, a region defined by target bounding region 51 in first measured data 28 may not be accurately fitted to the corresponding region in nominal data 30 after the initial alignment. Part 22 may have deformed during service from exposure to harsh environmental conditions (e.g., hot combustion gasses). A geometry of part 22 after service (i.e. as illustrated in first measured data 28) may be different than a nominal geometry of part 22 (i.e. as illustrated in nominal data 30). In some embodiments, it may be desirable to have the region defined by target bounding region 51 in first measured data 28 accurately fitted to the corresponding region in nominal data 30 in order to accurately determine first location 38A and first orientation 40A of first hole 20A and first location 38B and first orientation 40B of second hole 20B.

FIG. 10B is a graphical representation of a region of first measured data 28 captured by target bounding region 51. As depicted, first location 38A of first hole 20A in first measured data 28 is offset from nominal location 43A of first hole 20A in nominal data 30 by first positional deviation $D_2$. In some embodiments, first positional deviation $D_2$ may be greater than a desired threshold T. Threshold T may define a maximum deviation between first location 38A and nominal location 43A allowable for ensuring that first location 38A and first orientation 40A of first hole 20A and first location 38B and first orientation 40B of second hole 20B can be determined sufficiently accurately.

Although, target bounding region 51 is depicted as having a rectangular profile, it is understood that target bounding region 51 may have a profile of a different shape. Although target bounding region 51 is depicted as being a region including multiple features (e.g. holes 20), it is understood that target bounding region 51 may be a region that includes one or more features. In some embodiments, target bounding region 51 may be a region that includes only first hole 20A. In some embodiments, target bounding region 51 may be region that includes only second hole 20B. In some embodiments, target bounding region 51 may include first hole 20A and second hole 20B.

After the initial fitting, method 300 may include determining if a region defined by target bounding region 51 in first measured data 28 is fitted within an acceptable tolerance to the corresponding region in nominal data 30 to permit an accurate determination of first location 38A and first orientation 40A of first hole 20A.

In some embodiments, determining if the region defined by target bounding region 51 in first measured data 28 is fitted to the corresponding region in nominal data 30 to permit an accurate determination of first location 38A and first orientation 40A of first hole 20A may include computing first positional deviation $D_2$ between an estimated center of first hole 20A in first measured data 28 and an estimated center of first hole 20A in nominal data 30. Determining the first positional deviation $D_2$ may require a user to manually select the centre of first hole 20A in first measured data 28 and manually select the centre of first hole 20A in nominal data 30 using a CAD or metrology software such as POLYWORKS®. Alternatively, a process of determining the first positional deviation $D_2$ may be automated or partially automated using macros or application programming interfaces (API) of suitable CAD or metrology software.

In a situation that first positional deviation $D_2$ is less than threshold T, it may be determined that the region defined by target bounding region 51 in first measured data 28 is adequately fitted to the corresponding region in nominal data 30. In a situation where first positional deviation $D_2$ is greater than threshold T, method 300 may proceed to block 60 of method 300 to improve the quality of the best fit especially in cases where the deformation of part 22 from nominal geometric data 30 is significant. In some embodiments, the initial fitting may not be conducted and method 300 may begin at block 60 of method 300.

Figure 11:
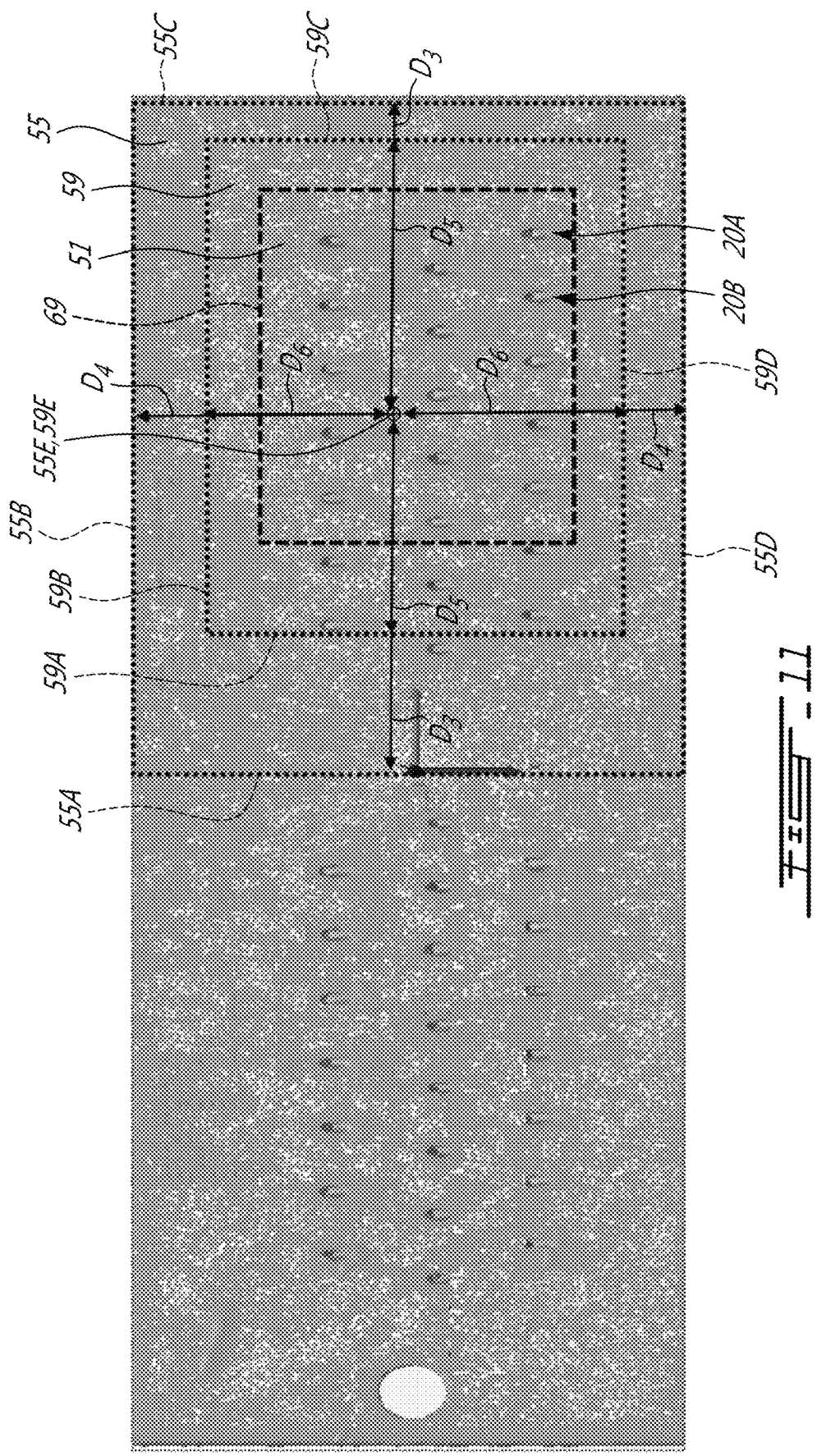
FIG. 11 is a graphical representation of the first measured data of FIG. 5, a target bounding region, a first proposed bounding region, and a second proposed bounding region.

Method 300 may include generating a copy of first measured data 28 (block 60). Method 300 may include creating first proposed bounding region 55 within the copy of first measured data 28 (as shown in FIG. 11) (block 62). First proposed bounding region 55 may be set to capture a region in first measured data 28 which includes target bounding region 51.

FIG. 11 is a graphical representation of the copy of first measured data 28, first proposed bounding region 55, second proposed bounding region 59 and target bounding region 51 (shown in broken lines). As illustrated in FIG. 11, sides 55A and 55C of first proposed bounding region 55 are set to be at distance $D_3$ from temporary origin 55E and sides 55B and 55D are set to be at a distance $D_4$ from temporary origin 55E. As depicted, a location of temporary origin 55E is proximate target bounding region 51 and is offset from a location of an origin of a coordinate system used to locate the copy of first measured data 28. A size of first proposed bounding region 55 and a location of temporary origin 55E may be automatically or manually chosen. In some cases, a size of first proposed bounding region 55 and a location of temporary origin 55E may be chosen based on a size of target bounding region 51 and/or a location of target bounding region.

Method 300 may include reducing the copy of first measured data 28 by removing one or more first data points from the copy of first measured data 28 that are outside of first proposed bounding region 55 (block 64). The copy of first measured data 28 may be reduced to define only geometric coordinates of points within first proposed bounding region 55 after removing the one or more first data points.

Although first proposed bounding region 55 is illustrated as capturing a volume that is greater than a region of target bounding region 51, it should be understood that first proposed bounding region 55 may be set to be equal to target bounding region 51. In this situation, the copy of first measured data 28 may be reduced to define only geometric coordinates of points within target bounding region 51 after the one or more first data points are removed.

Method 300 may include determining a first transformation required to best fit the reduced copy of first measured data 28 to nominal data 30 (block 66). Determining a first transformation may include creating a first transformation matrix using the reduced copy of first measured data 28. The first transformation matrix may be indicative of a transformation (e.g. translation and/or rotation) to be applied, relative to a coordinate system, to best fit the reduced copy of the first measured data 28 to nominal data 30 to reduce positional deviation $D_2$. For example a known or other best-fit algorithm may be applied to fit the reduced copy of the first measured data 28 to nominal data 30 and the resulting coordinate transformation matrix may be recorded. Method 300 may then include fitting (the non-reduced, original) first measured data 28 to nominal data 30 according to the recorded transformation matrix (block 67).

In some embodiments, after fitting the original or reduced first measured data 28 to nominal data 30 according to the first transformation, method 300 may include determining if the region defined by target bounding region 51 in first measured data 28 is aligned to the corresponding region in nominal data 30 (block 68) to an acceptable tolerance.

In some embodiments, determining if the fitting of the region defined by target bounding region 51 in first measured data 28 to the corresponding region in nominal data 30 is acceptable may include computing a second positional deviation (not shown) between an estimated center of first hole 20A in first measured data 28 and an estimated center of first hole 20A in nominal data 30 after fitting. Computing the second positional deviation may involve using a similar technique as explained above for computing first positional deviation $D_2$.

In a situation where first proposed bounding region 55 is created to capture a volume that is the same as a volume of target bounding region 51, it may be determined that the region defined by target bounding region 51 in first measured data 28 is aligned as close as possible to the corresponding region in nominal data 30. In this situation, method 300 may proceed to determining first location 38A and first orientation 40A of first hole 20A (block 69).

However, in a situation that first proposed bounding region 55 defines a volume that is greater than a volume of target bounding region 51, method 300 may flow back to block 62 and a second proposed bounding region 59 may be created within the reduced copy of first measured data 28 that more closely narrows in on target bounding region 51 than first proposed bounding region 55. In other words the reduced copy of first measured data 28 may be further reduced based on a smaller proposed bounding region and part of method 300 may be repeated iteratively until an acceptable best fit is obtained.

As depicted in FIG. 11, sides 59A and 59C of second proposed bounding region 59 are set to be at a distance $D_5$ from temporary origin 59E and sides 59B and 59D are set to be at a distance $D_6$ from temporary origin 59E. As depicted, $D_5$ is less than $D_3$ and $D_6$ is less than $D_4$. A volume captured by second proposed bounding region 59 may be less than a volume captured by first proposed bounding region 55.

Although a first depth of first proposed bounding region 55 and a second depth of second proposed bounding region 59 are not depicted, it should be understood the second depth may be equal to or less than the first depth. Similarly, a target depth of target bounding region 51 may be equal or less than the first depth and the second depth.

Method 300 may be a form of bounding box regression and may include further reducing the reduced copy of first measured data 28 by removing one or more second data points from the reduced copy of first measured data 28 that are outside second proposed bounding region 59 (block 64). The copy of first measured data 28 may be reduced to define only geometric coordinates of points within second proposed bounding region 59 after removing the one or more second data points.

Method 300 may include determining a second transformation required to best fit the twice (or more times) reduced copy of first measured data 28 to nominal data 30 (block 66). Determining the second transformation may include creating a second transformation matrix using the twice reduced copy of first measured data 28. The second transformation matrix may be indicative of a transformation (e.g. translation and/or rotation) to be applied, relative to a coordinate system, to best fit the twice reduced copy of the first measured data 28 to nominal data 30 to reduce positional deviation $D_2$. For example, a known or other best-fit algorithm may be applied to fit the twice reduced copy of the first measured data 28 to nominal data 30 and the resulting coordinate transformation matrix may be recorded. Method 300 may then include fitting (the non-reduced, original) first measured data 28 to nominal data 30 according to the recorded transformation matrix (block 67).

Method 300 may then flow back to block 68 of determining if the fitting of the region defined by target bounding region 51 in first measured data 28 to the corresponding region in nominal data 30 is acceptable.

In a situation that second proposed bounding region 59 is created to capture a volume that is the same as a volume of target bounding region 51, it may be determined that the region defined by target bounding region 51 in first measured data 28 is aligned as close as possible to the corresponding region in nominal data 30. In this situation, method 300 may proceed to determining first location 38A and first orientation 40A of first hole 20A (block 69).

In some embodiments, determining if the region defined by target bounding region 51 in first measured data 28 is fitted to an acceptable degree to the corresponding region in nominal data 30 may include computing a third deviation between an estimated center of first hole 20A in first measured data 28 and an estimated center of first hole 20A in nominal data 30. Computing the third positional deviation may involve using the technique explained above for computing first positional deviation $D_2$.

In a situation where the second positional deviation is equal to the third positional deviation, it may be determined that target bounding region 51 in first measured data 28 is fitted as close as possible to the corresponding region in nominal data 30. In this situation, method 300 may proceed to determining first location 38A and first orientation 40A of first hole 20A (block 69).

In a situation where the second positional deviation is not equal to the third positional deviation, method 300 may flow back to block 62 and a new proposed bounding region (not shown) may be created that more closely narrows in on target bounding region 51 than second proposed bounding region 59.

The process of creating a proposed bounding region in the copy of first measured data 28, reducing the copy of first measured data 28 by removing one or more data points outside the proposed bounding region, determining a transformation required to best fit the reduced copy of first measured data 28 to the nominal data 30 and fitting the first measured data 28 to the nominal data 30 using the transformation may be repeated in an iterative manner until a first condition and/or a second condition are met. The first condition may occur when a proposed bounding region is created that has a volume that is the same as a volume of target bounding region 51. The second condition may occur when a positional deviation computed between first hole 20A in first measured data 28 and first hole 20A in nominal data 30 after an $n^{th}$ fitting attempt is equal to a positional deviation computed between first hole 20A in first measured data 28 and first hole 20A in nominal data 30 after an $n^{th}-1$ fitting attempt. It should be understood that a new proposed bounding region may be created to have a volume that is less than any previous proposed bounding region(s) created and a volume of the new proposed bounding region may include a volume of target bounding region 51.

If the second condition is met before the first condition, the proposed bounding region (not shown) created for the $n^{th}$ fitting attempt may have a volume that is greater than a volume of target bounding region 51. This may be advantageous since the reduced copy of first measured data 28 used to create the $n^{th}$ transformation matrix for the $n^{th}$ fitting attempt may also contain data points outside target bounding region 51.

The transformation of original (unreduced) first measured data 28 using transformation matrix determined using the above method may be advantageous because the complete first measured data 28 may include datum or other features that may be useful in the repair process for the purpose of establishing a coordinate system and/or locating part 22 on or relative to drilling system 36.

Although method 300 involves creating a proposed bounding region in a copy of first measured data 28 and reducing the copy of first measured data 28 by removing one or more data points outside the proposed bounding region in the copy of first measured data 28, it should be understood that method 300 may instead involve creating a proposed bounding region in a copy of nominal data 30 and reducing the copy of nominal data 30 by removing one or more data points outside the proposed bounding region in the copy of nominal data 30. In this case, method 300 may involve determining a transformation required to best fit the reduced copy of nominal data 30 to first measured data 28 and fitting nominal data 30 to first measured data 28 using the transformation.

Figure 12:
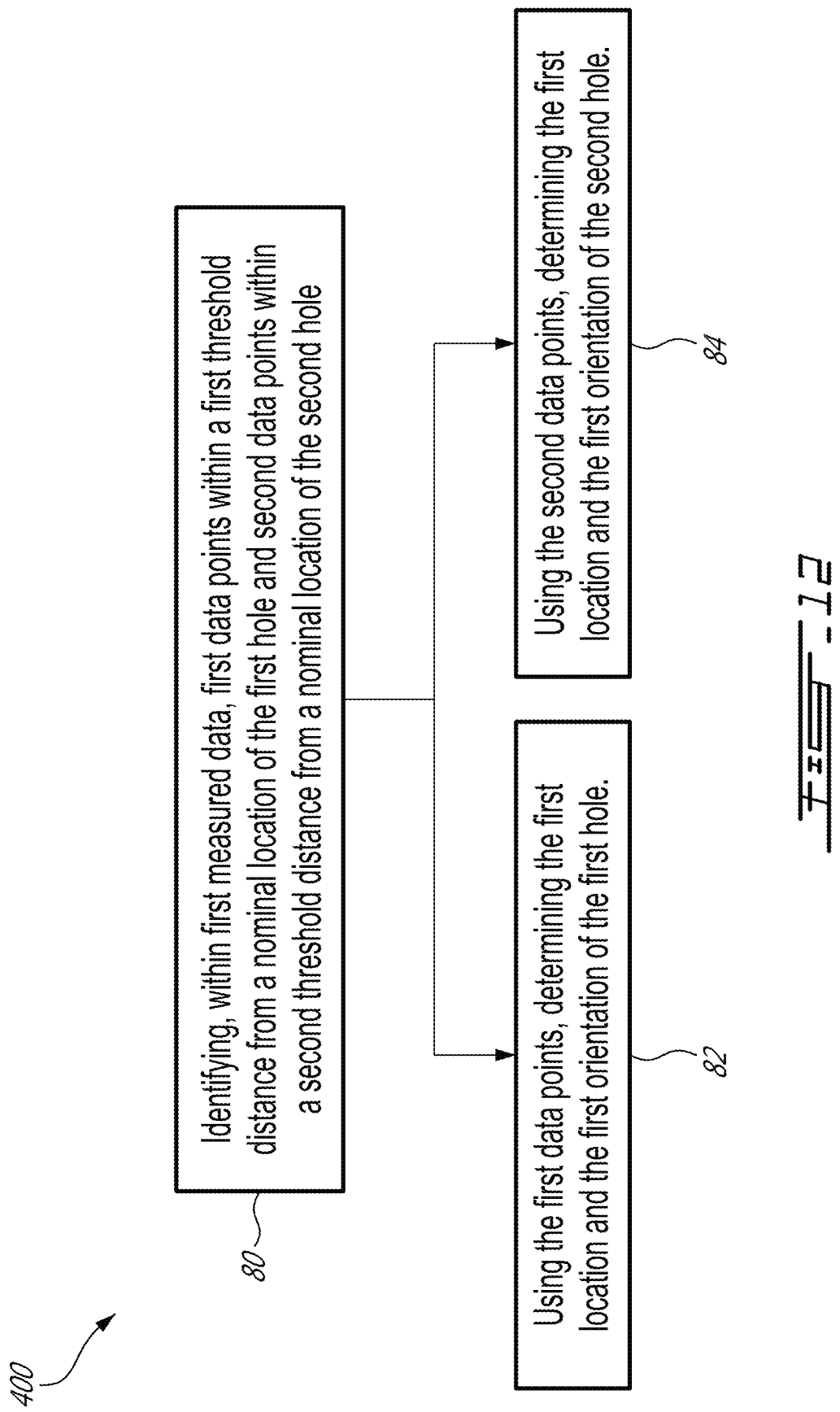
FIG. 12 is a flow diagram illustrating an exemplary method for determining a first location and a first orientation of a first hole and a first location and first orientation of a second hole in the uncoated part using the first measured data of FIG. 5.

FIG. 12 is a flow diagram illustrating an exemplary method 400 for determining first location 38A and first orientation 40A of first hole 20A and first location 38B and first orientation 40B of second hole 20B using first measured data 28. It is understood that aspects of method 400 may be combined with aspects of other methods described herein. Aspects of method 400 are explained below in reference to FIGS. 13-15.

FIG. 13 is a table showing exemplary first measured data 28 containing first data points 72 (illustrated as points 5-9) and second data points 73 (illustrated as points 13-17). Method 400 may include identifying first data points 72 and second data points 73 in first measured data 28 using nominal data 30. First data points 72 may be the data points in first measured data 28 that are within a first threshold distance from nominal location 43A of first hole 20A. Second data points 73 may be the data points in first measured data 28 that are within a second threshold distance from nominal location 43B of second hole 20B. The first threshold distance may be equal or not equal to the second threshold distance.

Method 400 may include generating first plane representation 74 (as shown in FIG. 14) in first measured data 28 from first data points 72 and generating second plane representation 75 (as shown in FIG. 14) in first measured data 28 from second data points 73. The plane representations may be defined using a point and a normal, three non-collinear points, a line fitted through the first data points 72 and a point not on that line, two intersecting lines fitted through the first data points 72, or two parallel lines fitted through the first data points 72 for example.

FIG. 14 is a graphical representation of a portion of first measured data 28 fitted to a portion of nominal data 30. First plane representation 74 may be generated using at least some of first data points 72. First plane representation 74 may be a representation of an area on a surface of part 22 where first hole 20A is expected to be located. Second plane representation 75 may be generated using at least some of second data points 73. Second plane representation 75 may be a representation of an area on a surface of part 22 where second hole 20B is expected to be located.

In some embodiments, the first threshold distance used to identify first data points 72 and the second threshold distance used to identify second data points 73 may both be equal to spacing $D_7$ divided by two. Spacing $D_7$ may be a distance between nominal location 43A of first hole 20A and nominal location 43B of second hole 20B. In this case, first plane representation 74 and second plane representation 75 may be circular and may capture an area of equal size. Although first plane representation 74 and second plane representation 75 are depicted as being flat/planar, it should be understood that in some embodiments, first plane representation 74 and second plane representation 75 may be curved to follow a curved surface of part 22. In some embodiments, a shape of first plane representation 74 may be different than a shape of second plane representation 75.

Method 400 may include generating first cylinder representation 76 (as shown in FIG. 15) in first measured data 28 from first data points 72 and second cylinder representation 77 (as shown in FIG. 15) in first measured data 28 from second data points 73. Cylinder representations 76, 77 may be created by fitting part of a cylindrical surface through some of data points 72, 73. The part of the cylindrical surface fitted through the data points 72, 73 may then be used to derive a radius (or diameter), an orientation (e.g., i, j, k) and a location of the cylindrical representation 76 or 77. Cylinder representations 76, 77 may have a substantially circular cross-sectional profile.

FIG. 15 is a graphical representation of first measured data 28, first plane representation 74, second plane representation 75, first cylinder representation 76 and second cylinder representation 77. As depicted, first cylinder representation 76 intersects first plane representation 74 and second cylinder representation 77 intersects second plane representation 75. First cylinder representation 76 may be created by using select data points within first data points 72 that represent points on a surface of part 22 that define first hole 20A. For example, the selected data points may be points on a lip of first hole 20A on surface 23 of part 22 and/or points on inner surfaces 25A of part 22 (as shown in FIG. 5). Second cylinder representation 77 may be created by using select data points within second data points 73 that represent points on a surface of part 22 that define second hole 20B. For example, the selected data points may be points on a lip of second hole 20B on surface 23 of part 22 and/or points on inner surfaces 25B of part 22 (as shown in FIG. 5).

Method 400 may include determining first location 38A and first orientation 40A of first hole 20A using first plane representation 74 and first cylinder representation 76. In some embodiments, a central axis of first cylinder representation 76 may correspond to first orientation 40A of first hole 20A. In some embodiments, an intersection of first plane representation 74 and a central axis of first cylinder representation 76 may correspond to first location 38A of first hole 20A.

Similarly, method 400 may include determining first location 38B and first orientation 40B of second hole 20B using second plane representation 75 and second cylinder representation 77. In some embodiments, a central axis of second cylinder representation 77 may correspond to first orientation 40B of second hole 20B. In some embodiments, an intersection of second plane representation 75 and a central axis of second cylinder representation 77 may correspond to first location 38B of second hole 20B.

After determining first location 38A and first orientation 40A of first hole 20A and first location 38B and first orientation 40B of second hole 20B, deposition system 32 may apply coating 24 on part 22. The application of coating 24 on part 22 may cause one or more holes 20 to be at least partially obstructed by coating 24, while leaving one or more other holes 20 unobstructed by coating 24. The application of coating 24 on part 22 may cause second hole 20B to be at least partially obstructed by coating 24, while first hole 20A may remain substantially unobstructed by coating 24.

FIG. 16 schematically illustrates the acquisition of second measured data 34 using measurement device 26 of system 44 when part 22 is in a coated state. Measurement device 26 may be configured to 3D scan first side 22A of part 22 which is coated to obtain second measured data 28.

Alternatively or in addition, measurement device 26 may be used to 3D scan a non-coated side (e.g. second side 22B) of part 22 to determine second measured data 28 (as shown in FIG. 17). This may be a situation where first measured data 28 was acquired by 3D scanning second side 22B of part 22. The illustrations in FIGS. 16 and 17 are provided in schematic form and it is understood that coating material may penetrate and at least partially block second hole 20B. Depending on the size and orientation of second hole 20B, the thickness of part 22, the coating material could potentially flow to the opposite side of part 22. Accordingly, scanning of the uncoated second side 22B may also be used to identify at least partially blocked holes 20B. The presence of coating material inside second hole 20B may, in some situations, prevent the proper characterization of second hole 20B whether the scanning is performed from the coated or uncoated side of part 22.

As depicted in FIG. 16, second hole 20B is obstructed by coating 24, while first hole 20A is substantially unobstructed by coating 24. It is understood that measurement device 26 may operate in the same or a similar manner to acquire second measured data 34 as measurement device 26 operates to acquire first measured data 28.

Second location 82A of first hole 20A may be indicative of a location of a central axis of first hole 20A on first side 22A of part 22 when part 22 is in the coated state. Second location 82B of second hole 20B may be indicative of a location of a central axis of second hole 20B on first side 22A of part 22 when part 22 is in the coated state. As depicted, second location 82A of first hole 20A is spaced apart from second location 82B of second hole 20B by spacing $D_1$. Second orientation 84A of first hole 20A may be indicative of an orientation of the central axis of first hole 20A of part 22 when part 22 is in the coated state. Second orientation 84B of second hole 20B may be indicative of an orientation of the central axis of second hole 20B of part 22 when part 22 is in the coated state. As depicted, the central axis of first hole 20A is oriented at angle $\beta_A$ relative to portion 85 of surface 83 of part 22. As depicted, the central axis of second hole 20B is oriented at angle $\beta_B$ relative to portion 86 of surface 83 of part 22. In some embodiments, angle $\beta_A$ may be substantially equal to angle $\beta_B$. A known thickness of coating 24 may be used to infer locations 82A, 82B under coating 24 based on the second measured data 34.

In some cases, the application of coating 24 on part 22 may cause part 22 to deform due to the exposure to heat for example. Therefore, a geometry of the base material of part 22 in an uncoated state may differ from a geometry of the base material of part 22 in a coated state. First location 38A and first orientation 40A of first hole 20A may be different than second location 82A and second orientation 84A of first hole 20A, respectively. Similarly, first location 38B and first orientation 40B of second hole 20B may be different than second location 82B and second orientation 84B of second hole 20B, respectively. However, the relative spacing $D_1$ between first location 38A of first hole 20A and first location 38B of second hole 20B may be substantially equal to spacing $D_1$ between second location 82A of first hole 20A and second location 82B of second hole 20B.

Measurement device 26 may be automatically or manually controlled during the scanning process to obtain measurement readings (i.e. data points) necessary to determine second location 82A and second orientation 84A of first hole 20A. Depending on its type and/or orientation, measurement device 26 may be incapable of obtaining measurement readings in undetectable region 87 of first hole 20A. Second location 82A and second orientation 84A of first hole 20A may be determined using the data points acquired within the detectable region of second hole 20A. Measurement device 26 may be incapable of scanning second hole 20B due to the presence of coating 24 occluding second hole 20B.

In some embodiments, second measured data 34 may be fitted to first measured data 28. In some situations, a geometry of part 22 in the uncoated state may be different than a geometry of part 22 in the coated state. In these situations, second measured data 34 may not accurately fit to first measured data 28 to permit an accurate determination of second location 82A and second orientation 84A of first hole 20A after an initial fitting. A fitting technique according to method 300 may be employed to fit a region defined by a second target bounding region (not shown) in second measured data 34 with the corresponding region in first measured data 28.

FIG. 18 is a flow diagram illustrating an exemplary method 500 for determining second location 82A and second orientation 84A of first hole 20A and second location 82B and second orientation 84B of second hole 20B. Some of the techniques described in relation to method 400 above may be used in method 500. It is understood that aspects of method 500 may be combined with aspects of other methods described herein. Aspects of method 500 are explained in reference to FIGS. 19 and 20.

FIG. 19 is a table showing second measured data 34 containing first data points 90 (illustrated as points 3-7) and second data points 92 (illustrated as points 11-15). Method 500 may include identifying first data points 90 and second data points 92 in second measured data 34 using first measured data 28. First data points 90 may be the data points in second measured data 34 that are within a first threshold distance from first location 38A of first hole 20A and second data points 92 may be the data points in second measured data 34 that are within a second threshold distance from first location 38B of second hole 20B (block 94). In some embodiments, the first threshold distance may be equal or not equal to the second threshold distance.

Method 500 may include using first data points 90 to determine that first hole 20A is substantially unobstructed by coating 24 (block 96). Method 500 may include generating first plane representation 104 (as shown in FIG. 20) in second measured data 34 on a surface of part 22 from first data points 90. First plane representation 104 may be defined by at least some of first data points 90. First plane representation 104 may be a representation of an area on a surface of part 22 where first hole 20A is expected to be located. Method 500 may include generating first cylinder representation 106 (as shown in FIG. 20) in second measured data 34 from first data points 90. First cylinder representation 106 may be created by using data points within first data points 90 that represent points on a surface of part 22 that define first hole 20A. For example, the selected data points may be representative of points on a lip of first hole 20A on surface 83 of part 22 and/or points on inner surfaces 89A of part 22 (as shown in FIG. 16).

FIG. 20 is a graphical representation of a portion of second measured data 28, first plane representation 104 and first cylinder representation 106. As depicted, first cylinder representation 106 may intersect first plane representation 104.

Method 500 may include determining second location 82A and second orientation 84A of first hole 20A using first data points 90 (block 97). Specifically, method 500 may include determining second location 82A and second orientation 84A of first hole 20A using first plane representation 104 and first cylinder representation 106. In some embodiments, a central axis of first cylinder representation 106 may correspond to second orientation 84A of first hole 20A. In some embodiments, an intersection of first plane representation 104 and the central axis of first cylinder representation 106 may correspond to second location 82A of first hole 20A.

Method 500 may include using the second data points 92 to determine that second hole 20B is at least partially obstructed by coating 24 (block 98). Method 500 may include generating a second plane representation (not shown) in second measured data 34 on a surface of part 22 from second data points 92. However, since second hole 20B is at least partially obstructed by coating 24, it may not be possible to adequately generate a second cylinder representation in second measured data 34 from second data points 92 due to the presence of coating material inside second hole 20A. In this case, a plane representation and a cylinder representation cannot be used to determine second location 82B and second orientation 84B of second hole 20B.

Instead, method 500 may include inferring second location 82B of second hole 20B using second location 82A of first hole 20A (block 102). Inferring second location 82B of second hole 20B may include using known spacing $D_1$ between first location 38A of first hole 20A and first location 38B of second hole 20B. Spacing $D_1$ between first location 38A of first hole 20A and first location 38B of second hole 20B may be may be substantially unaffected by the coating process. In some embodiments, second location 82B of second hole 20B may be determined using equation 1 shown below:

$$(X_{B2}, Y_{B2}, Z_{B2}) = (X_{A2}, Y_{A2}, Z_{A2}) + (X_{B1} - X_{A1}, Y_{B1} - Y_{A1}, Z_{B1} - Z_{A1}) \quad (1)$$

In equation 1, $X_{B2}$, $Y_{B2}$ and $Z_{B2}$ may be the x-axis coordinate, y-axis coordinate and z-axis coordinate, respectively, of second location 82B of second hole 20B. $X_{A2}$, $Y_{A2}$ and $Z_{A2}$ may be the x-axis coordinate, y-axis coordinate and z-axis coordinate, respectively, of second location 82A of first hole 20A. $X_{B1}$, $Y_{B1}$ and $Z_{B1}$ may be the x-axis coordinate, y-axis coordinate and z-axis coordinate, respectively, of first location 38B of second hole 20B. $X_{A1}$, $Y_{A1}$ and $Z_{A1}$ may be the x-axis coordinate, y-axis coordinate and z-axis coordinate, respectively, of first location 38A of first hole 20A.

In some embodiments, determining second orientation 84B of second hole 20B may includes assigning first orientation 40B of second hole 20B as second orientation 84B of second hole 20B. Alternatively, second orientation 84B of second hole 20B may include an adjustment of first orientation 40B of second hole 20B based on a difference between first orientation 40A of first hole 20A and second orientation 84A of first hole 20A. In a situation where angle as of second hole 20B is determined to be substantially equal to angle $\alpha_A$ of first hole 20A, it may be assumed that second orientation 84B of second hole 20B is equal to second orientation 84A of first hole 20B.

FIG. 21 schematically illustrates drilling through coating 24 at least partially obstructing second hole 20B of part 22 using drilling system 36 of system 44. Drilling through coating 24 at least partially obstructing second hole 20B using second location 82B and second orientation 84B of the second hole 20B. Using second location 82B and second orientation 84B of second hole 20B, suitable instructions can be generated to control drilling system 36 during the drilling of obstructed second hole 20B. In some embodiments, such instructions can comprise computer numerical control (CNC) commands for controlling the positioning of drilling system 36 for the re-drilling operation and other instructions for controlling other parameters of drilling system 36. Such instructions (e.g., output 53 shown in FIG. 4) can be generated by computer 50 configured to implement a suitable computer-aided-design/computer-aided-manufacturing (CAD/CAM) system for example.

FIG. 22 schematically illustrates the acquisition of second measured data 34 using measurement device 26 of system 44 with part 22 being in a coated state and containing repair patch 108 (shown in broken lines). Repair patch 108 may be added to part 22 to replace a damaged portion of a base metal of part 22. Repair patch 108 may be added before or after acquiring first measured data 28 of part 22 and before applying coating 24 on part 22. Repair patch 108 may replace a portion of part 22 where second hole 20B was previously defined. In this situation, drilling system 36 may be used to drill through coating 24 and through repair patch 108 to form second hole 20B in repair patch 108. Second location 82B and second orientation 84B of second hole 20B may be inferred using second location 82A and second orientation 84A of first hole 20A and first measured data 28. Specifically, second location 82B and second orientation 84B of second hole 20B may be inferred using a similar technique as the technique explained above in method 500.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example the methods and systems described herein could also be used on parts other than combustor liners of gas turbine engines. Yet further modifications could be implemented by a person of ordinary skill in the art in view of the present disclosure, which modifications would be within the scope of the present technology.

What is claimed is:

1. A method of characterizing holes in a perforated part deformed from a coating process in preparation for repair, the method comprising:
receiving first measured data indicative of a geometry of a region of the part including a first hole and a second hole with the part in an uncoated state;
using the first measured data, determining:
a first location and a first orientation of a first hole in the part with the part in the uncoated state; and
a first location and a first orientation of a second hole in the part with the part in the uncoated state;
receiving second measured data indicative of a geometry of the region of the part with the part in a coated state where the region of the part is coated, the first hole is substantially unobstructed by a coating material and the second hole is at least partially obstructed by the coating material, the part being deformed from the coating process used to apply the coating;
using the second measured data, determining a second location of the first hole with the part in the coated state;
inferring a second location of the second hole with the part in the coated state using:
the second location of the first hole; and
a spacing between the first location of the first hole and the first location of the second hole;
determining a second orientation of the second hole with the part in the coated state based on the first orientation of the second hole; and
constructing a data set including data indicative of the second location and second orientation of the second hole.

2. The method of claim 1, wherein determining the second orientation of the second hole includes assigning the first orientation of the second hole as the second orientation of the second hole.

3. The method of claim 1, wherein determining the first location and the first orientation of the first hole, and the first location and the first orientation of the second hole additionally includes using nominal data indicative of a nominal geometry of the part.

4. The method of claim 3, comprising:
identifying, within the first measured data, data points within a threshold distance from a nominal location of the first hole defined in the nominal data; and
generating a cylinder representation from the data points, a central axis of the cylinder representation corresponding to the first orientation of the first hole.

5. The method of claim 4, comprising:
generating a plane representation from the data points, an intersection of the plane representation and the central axis of the cylinder representation corresponding to the second location of the first hole.

6. The method of claim 1, comprising:
identifying, within the second measured data, first data points within a first threshold distance from the first location of the first hole; and
using the first data points, determining that the first hole is substantially unobstructed.

7. The method of claim 6, comprising:
identifying, within the second measured data, second data points within a second threshold distance from the first location of the second hole; and
using the second data points, determining that the second hole is at least partially obstructed.

8. The method of claim 7, wherein at least some of the second measured data is acquired from an uncoated side of the part.

9. The method of claim 1, comprising:
identifying, within the second measured data, data points within a threshold distance from the first location of the first hole; and
generating a cylinder representation from the data points, a central axis of the cylinder representation corresponding to a second orientation of the first hole with the part in the coated state.

10. The method of claim 9, comprising:
generating a plane representation from the data points, an intersection of the plane representation and the central axis of the cylinder representation corresponding to the second location of the first hole.

11. The method of claim 1, wherein using the first measured data includes:
using nominal data indicative of a nominal geometry of the part, determining a target bounding region within the first measured data that includes the first and second holes;
generating a copy of the first measured data;
reducing the copy of the first measured data by removing one or more first data points from the copy of the first measured data that are outside of the target bounding region;
determining a first transformation required to best fit the reduced copy of the first measured data to the nominal geometry of the part;
fitting the first measured data to the nominal data according to the first transformation; and
determining the first location and the first orientation of the first hole with the part in the uncoated state using the nominal data and the first measured data.

12. The method of claim 11, wherein determining the first location and the first orientation of the first hole includes:
identifying, within the first measured data, second data points within a threshold distance from a nominal location of the first hole defined in the nominal data;
generating a cylinder representation from the second data points, a central axis of the cylinder representation corresponding to the first orientation of the first hole; and
generating a plane representation from the second data points, an intersection of the plane representation and the central axis of the cylinder representation corresponding to the first location of the first hole.

* * * * *